(12) United States Patent
Harada et al.

(10) Patent No.: US 11,761,552 B2
(45) Date of Patent: Sep. 19, 2023

(54) VALVE DEVICE

(71) Applicant: DENSO CORPORATION, Kariya (JP)

(72) Inventors: Hiroyuki Harada, Kariya (JP);
Yuichiro Moritani, Kariya (JP);
Takehiro Sugawara, Kariya (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 17/497,107

(22) Filed: Oct. 8, 2021

(65) Prior Publication Data
US 2022/0025989 A1    Jan. 27, 2022

Related U.S. Application Data

(63) Continuation of application No. PCT/JP2020/012406, filed on Mar. 19, 2020.

(30) Foreign Application Priority Data

Apr. 9, 2019  (JP) ................................. 2019-074242

(51) Int. Cl.
*F16K 27/04*    (2006.01)
*F16K 3/24*    (2006.01)

(52) U.S. Cl.
CPC .............. *F16K 27/04* (2013.01); *F16K 3/24* (2013.01); *F16K 2200/30* (2021.08)

(58) Field of Classification Search
CPC .................................. F16K 27/04; F16K 3/24
See application file for complete search history.

(56) References Cited

U.S. PATENT DOCUMENTS

2019/0264620 A1    8/2019  Moritani et al.

FOREIGN PATENT DOCUMENTS

JP            2015-94335         5/2015

*Primary Examiner* — Kevin R Barss
(74) *Attorney, Agent, or Firm* — Nixon & Vanderhye P.C.

(57) ABSTRACT

A valve device includes a housing, a valve member, a valve seat member, a fixing member for fixing the valve seat member to the housing, and a housing-side seal portion. The housing has a valve chamber, and a housing-space inner wall forming a housing space communicating with the valve chamber. The housing-side seal portion blocks a flow of fluid between the valve seat member and the housing-space inner wall. The valve seat member has a tubular portion and a flange portion connected to the tubular portion. The flange portion is interposed between a facing surface of the housing-space inner wall and the fixing member in an axial direction. The fixing member is fixed to the housing-space inner wall in an airtight state. The housing-side seal portion is made of a rubber material and is interposed between the flange portion and the fixing member.

5 Claims, 16 Drawing Sheets

INNER PERIPHERAL SIDE ⟵⟶ OUTER PERIPHERAL SIDE

INNER PERIPHERAL SIDE ⟵⟶ OUTER PERIPHERAL SIDE

VALVE DEVICE

CROSS REFERENCE TO RELATED APPLICATION

The present application is a continuation application of International Patent Application No. PCT/JP2020/012406 filed on Mar. 19, 2020, which designated the U.S. and claims the benefit of priority from Japanese Patent Application No. 2019-74242 filed on Apr. 9, 2019. The entire disclosures of all of the above applications are incorporated herein by reference.

TECHNICAL FIELD

The present disclosure relates to a valve device.

BACKGROUND

A valve device has a valve member and a valve seat member housed in a housing. The valve seat member includes a tubular portion in which a valve seat passage is formed, and an annular flange portion protruding from the tubular portion outward of the tubular portion.

SUMMARY

According to an aspect of the present disclosure, a valve device includes: a housing having a valve-chamber inner wall forming a valve chamber and a housing-space inner wall forming a housing space communicated with the valve chamber; a valve member housed in the valve chamber and having a valve body shaped in tubular or spherical; a valve seat member housed in the housing space and forming a valve seat passage that is opened and closed by the valve body; an annular fixing member housed in the housing space and fixing the valve seat member to the housing; and an annular housing-side seal portion that is housed in the housing space to block a flow of fluid between the valve seat member and the housing-space inner wall. The valve seat member has a tubular portion in which the valve seat passage is formed, and a flange portion connected to the tubular portion opposite to the valve chamber. The flange portion has an annular shape protruding outward from the tubular portion. The housing-space inner wall has an annular facing surface facing the flange portion in an axial direction of the flange portion. The valve seat member is fixed to the housing by the flange portion interposed between the facing surface and the fixing member in the axial direction. The fixing member is fixed to the housing-space inner wall in an airtight state between the fixing member and the housing-space inner wall. The housing-side seal portion is made of a rubber material and is interposed between the flange portion and the fixing member.

DESCRIPTION OF EMBODIMENT

Figure 1:
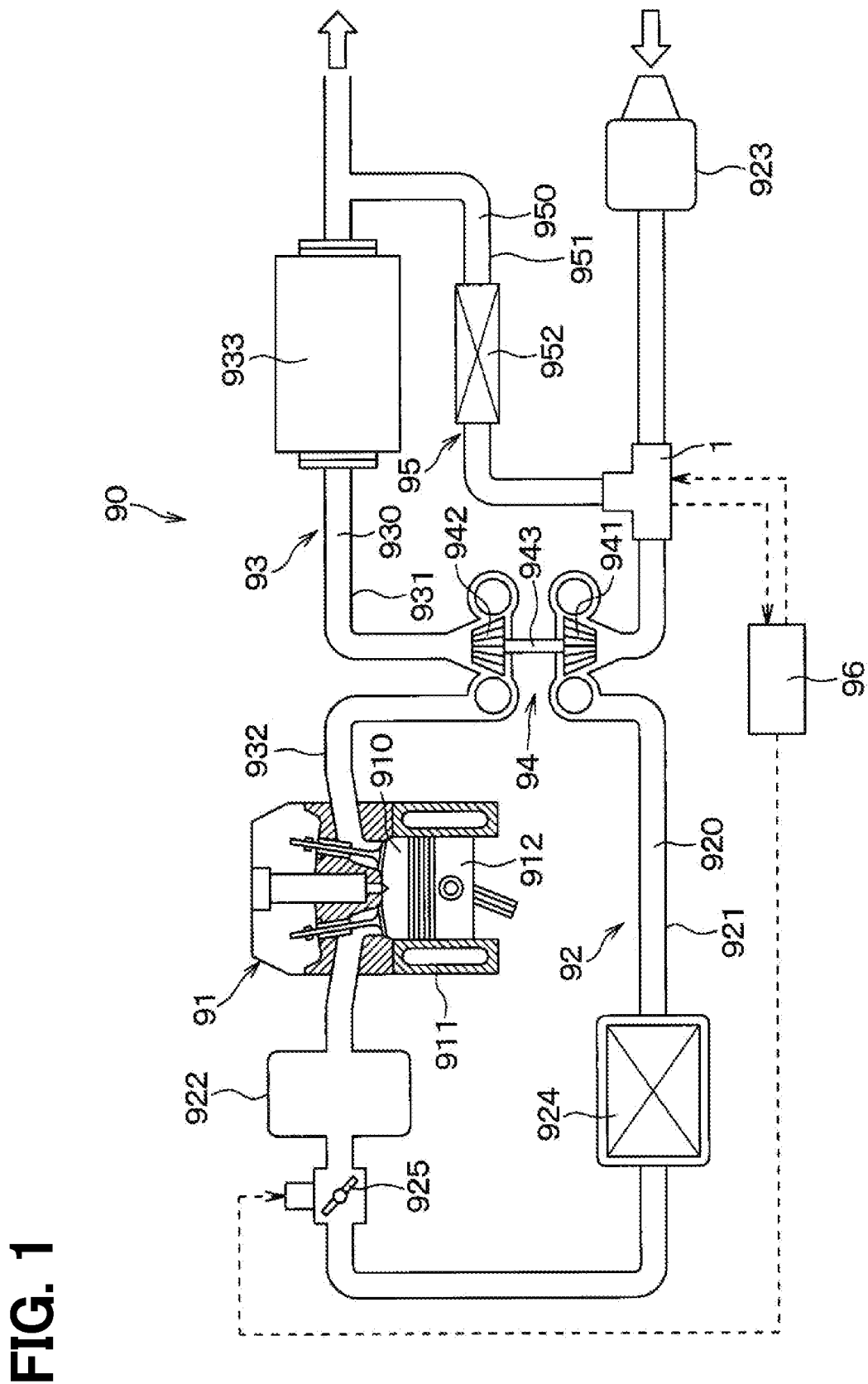
FIG. 1 is a schematic view of an engine system to which a valve device of a first embodiment is applied.

To begin with, examples of relevant techniques will be described.

A valve device has a valve member and a valve seat member housed in a housing. The valve seat member includes a tubular portion in which a valve seat passage is formed, and an annular flange portion protruding from the tubular portion outward of the tubular portion. An inner wall of the housing, which forms a space for housing the valve seat member, has an annular facing surface facing the flange portion. The flange portion is supported between the facing surface and an annular fixing member, such that the valve seat member is fixed on the housing.

In the valve device described above, a gap between the valve seat member and the housing is sealed due to a surface contact between the facing surface and one surface of the flange portion adjacent to the facing surface. However, the present inventors have found that when at least one of the facing surface and the one surface of the flange portion has low flatness, a gap remains between the step surface and the one surface of the flange portion. When the valve member closes the valve seat passage, a fluid can flow through the gap between the step surface and the one surface of the flange portion. That is, fluid leakage occurs since the fluid can flow between the housing and the valve seat member.

The present disclosure provides a valve device capable of blocking a flow of fluid between a housing and a valve seat member.

According to an aspect of the present disclosure, a valve device includes:

a housing having a valve-chamber inner wall forming a valve chamber and a housing-space inner wall forming a housing space communicated with the valve chamber;

a valve member housed in the valve chamber and having a valve body shaped in tubular or spherical;

a valve seat member housed in the housing space and forming a valve seat passage that is opened and closed by the valve body;

an annular fixing member housed in the housing space and fixing the valve seat member to the housing; and an annular housing-side seal portion that is housed in the housing space to block a flow of fluid between the valve seat member and the housing-space inner wall.

The valve seat member has a tubular portion in which the valve seat passage is formed, and a flange portion connected to the tubular portion opposite to the valve chamber. The flange portion has an annular shape protruding outward from the tubular portion.

The housing-space inner wall has an annular facing surface facing the flange portion in an axial direction of the flange portion, the valve seat member is fixed to the housing by the flange portion interposed between the facing surface and the fixing member in the axial direction, the fixing member is fixed to the housing-space inner wall in an airtight state between the fixing member and the housing-space inner wall, and the housing-side seal portion is made of a rubber material and is interposed between the flange portion and the fixing member.

Accordingly, the housing-side seal portion is supported between the flange portion and the fixing member. The housing-side seal portion can restrict fluid from flowing between the flange portion and the fixing member. Further, the space between the fixing member and the housing-space inner wall is in an airtight state. Therefore, it is possible to restrict the flow of fluid between the valve seat member and the housing.

The reference numerals in parentheses attached to the components and the like indicate an example of correspondence between the components and the like and specific components and the like described in an embodiment to be described below.

Hereinafter, embodiments of the present disclosure will be described with reference to the drawings. In the following embodiments, the same or equivalent parts are denoted by the same reference numerals as each other, and explanations will be provided to the same reference numerals.

First Embodiment

As shown in FIG. 1, a valve device 1 according to a first embodiment is Applied to an Engine System 90 that Generates Driving Force by Combusting Fuel.

[Engine System Configuration]

First, the engine system 90 will be described. The engine system 90 includes an engine 91, an intake system 92, an exhaust system 93, a supercharger 94, and an exhaust gas recirculation system 95. The engine 91 has a piston 912 housed in a cylinder 911 to form a combustion chamber 910.

The intake system 92 supplies outside air to the engine 91. The intake system 92 includes an intake pipe 921, an intake manifold 922, an air cleaner 923, an intercooler 924, and a throttle 925. Hereinafter, the air supplied to the engine 91 is referred to as intake air.

The intake pipe 921 forms an intake passage 920 to guide intake air to the combustion chamber 910. One end of the intake pipe 921 is open to outside air and the other end is connected to the intake manifold 922. The intake manifold 922 is connected to the other end of the intake pipe 921 and the engine 91. The intake manifold 922 branches into a number of passages corresponding to the number of cylinders 911. The air cleaner 923 removes foreign matter from the outside air taken in. The intercooler 924 cools the intake air that has been compressed and heated by the compressor 941 of the supercharger 94. The throttle 925 adjusts the amount of intake air for the engine 91. The throttle 925 is electrically connected to an electronic control unit 96. Hereinafter, the electronic control unit will be referred to as ECU.

The exhaust system 93 discharges the exhaust gas discharged from the engine 91 to outside. The exhaust system 93 includes an exhaust pipe 931, an exhaust manifold 932, and an exhaust purification unit 933. The exhaust pipe 931 forms an exhaust passage 930 to guide the exhaust gas of the engine 91 to outside. The exhaust manifold 932 is connected to one end of the exhaust pipe 931 and the engine 91. The exhaust manifold 932 includes passages equal to the number of cylinders 911, and the passages merge together. The exhaust purification unit 933 is provided in the exhaust pipe 931. The exhaust purification unit 933 decomposes hydrocarbon contained in the exhaust gas or captures particulate matter.

The supercharger 94 uses the energy of the exhaust gas to supercharge the intake air compressed into the combustion chamber 910 by compressing the intake air in the intake pipe 921. The supercharger 94 includes a compressor 941, a turbine 942, and a shaft 943. The compressor 941 is disposed between the air cleaner 923 and the intercooler 924 in the intake passage 920. The compressor 941 is capable of compressing intake air. The turbine 942 is disposed between the exhaust manifold 932 and the exhaust purification unit 933 in the exhaust passage 930. The turbine 942 is rotationally driven by the energy of exhaust gas. The shaft 943 connects the compressor 941 and the turbine 942. The compressor 941 and the turbine 942 are synchronously rotated by the shaft 943.

The exhaust gas recirculation system 95 returns the exhaust gas after passing through the turbine 942 to the intake passage 920 and supplies the exhaust gas to the combustion chamber 910 together with the air passing through the air cleaner 923. The exhaust gas recirculation system 95 includes an EGR pipe 951, an EGR cooler 952, and a valve device 1.

The EGR pipe 951 connects the exhaust pipe 931 downstream of the exhaust purification unit 933 to the intake pipe 921 upstream of the compressor 941. The EGR pipe 951 includes an EGR passage 950 that recirculates the exhaust gas having passed through the turbine 942 to the air prior to being compressed by the compressor 941. The EGR cooler 952 is provided in the EGR pipe 951. The EGR cooler 952 cools the gas passing through the EGR passage 950.

The valve device 1 is provided at a location where the EGR pipe 951 and the intake pipe 921 are connected with each other. The valve device 1 increases or decreases the flow rate of the exhaust gas flowing into the intake passage 920 through the EGR passage 950. The valve device 1 is electrically connected to the ECU 96.

The ECU 96 includes a microcontroller having a CPU as a computing unit, a RAM and a ROM as storage units, and the like. The ECU 96 controls the operation of the throttle 925 and the valve device 1 according to the operating status of a vehicle on which the engine system 90 is mounted or another device, and according to input from an operator operating the vehicle or the another device.

[Valve Device Configuration]

Next, the configuration of the valve device 1 will be described. The valve device 1 is a rotary valve that can increase or decrease the opening degree of passage for fluid by rotationally driving a cylindrical valve member. The valve device 1 can increase or decrease the opening degree of the EGR passage 950 with respect to the intake passage 920.

Figure 2:
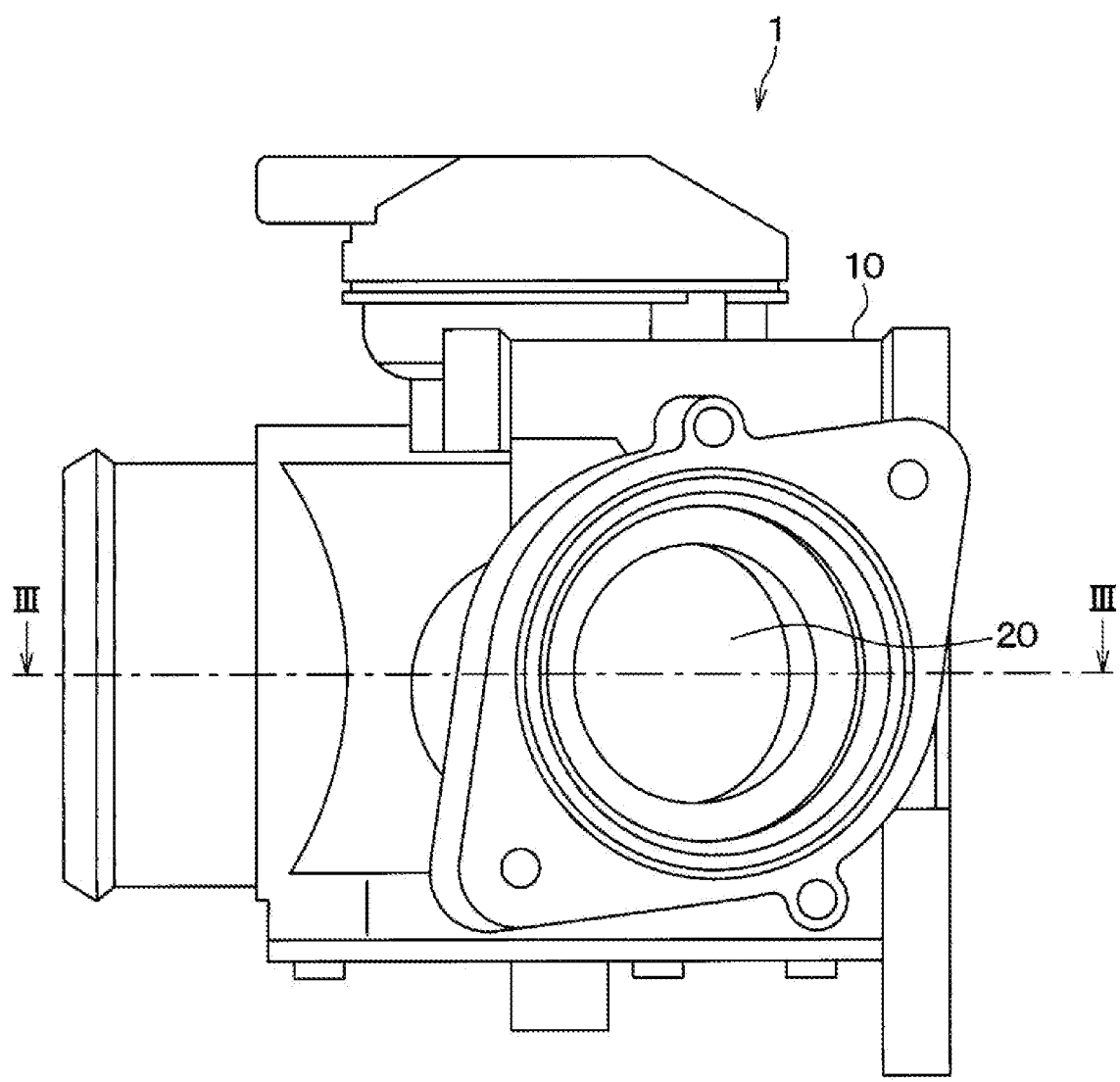
FIG. 2 is an external view illustrating the valve device of the first embodiment.
Figure 3:
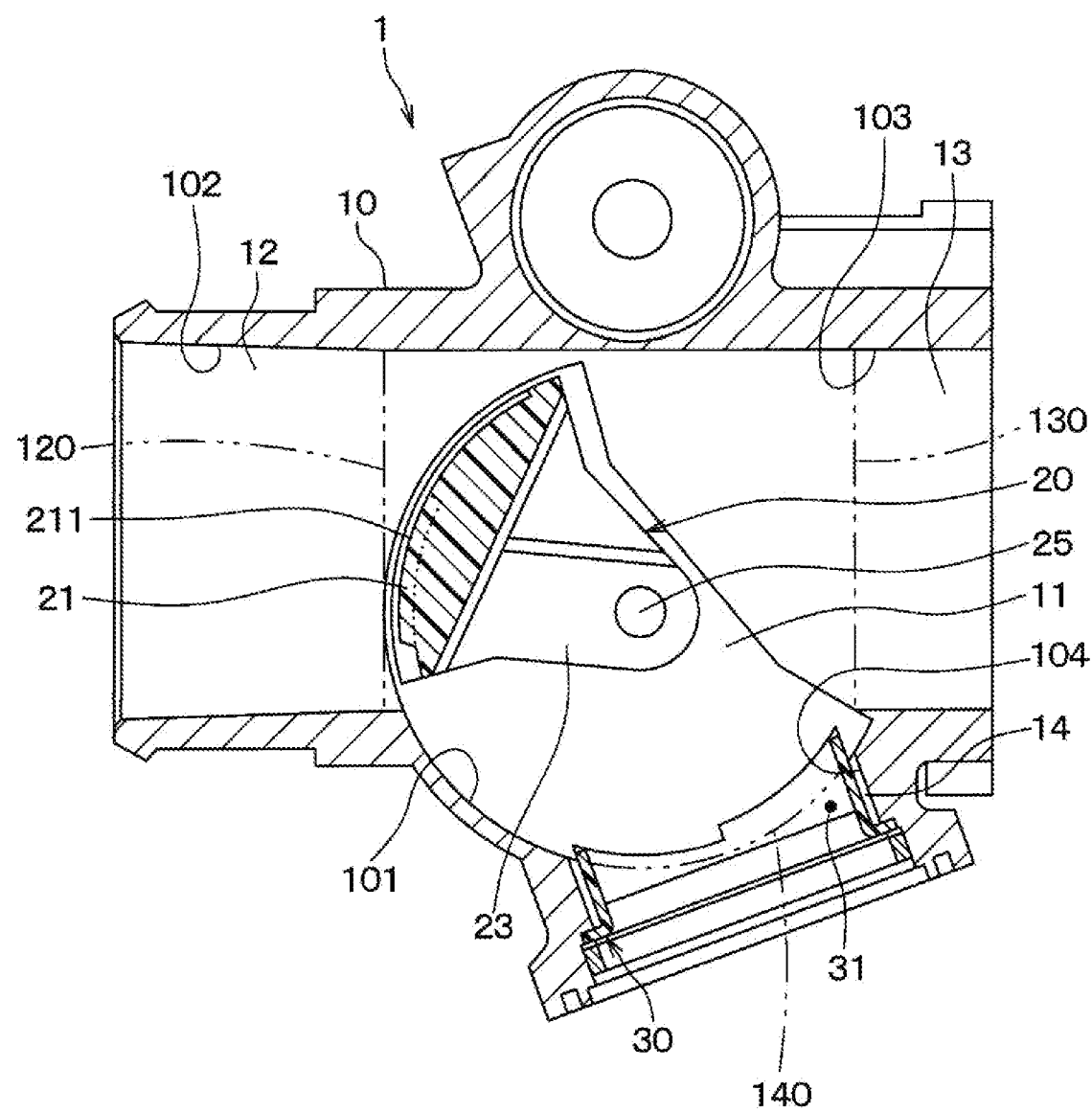
FIG. 3 is a cross-sectional view taken along a line III-III in FIG. 2.
Figure 4:
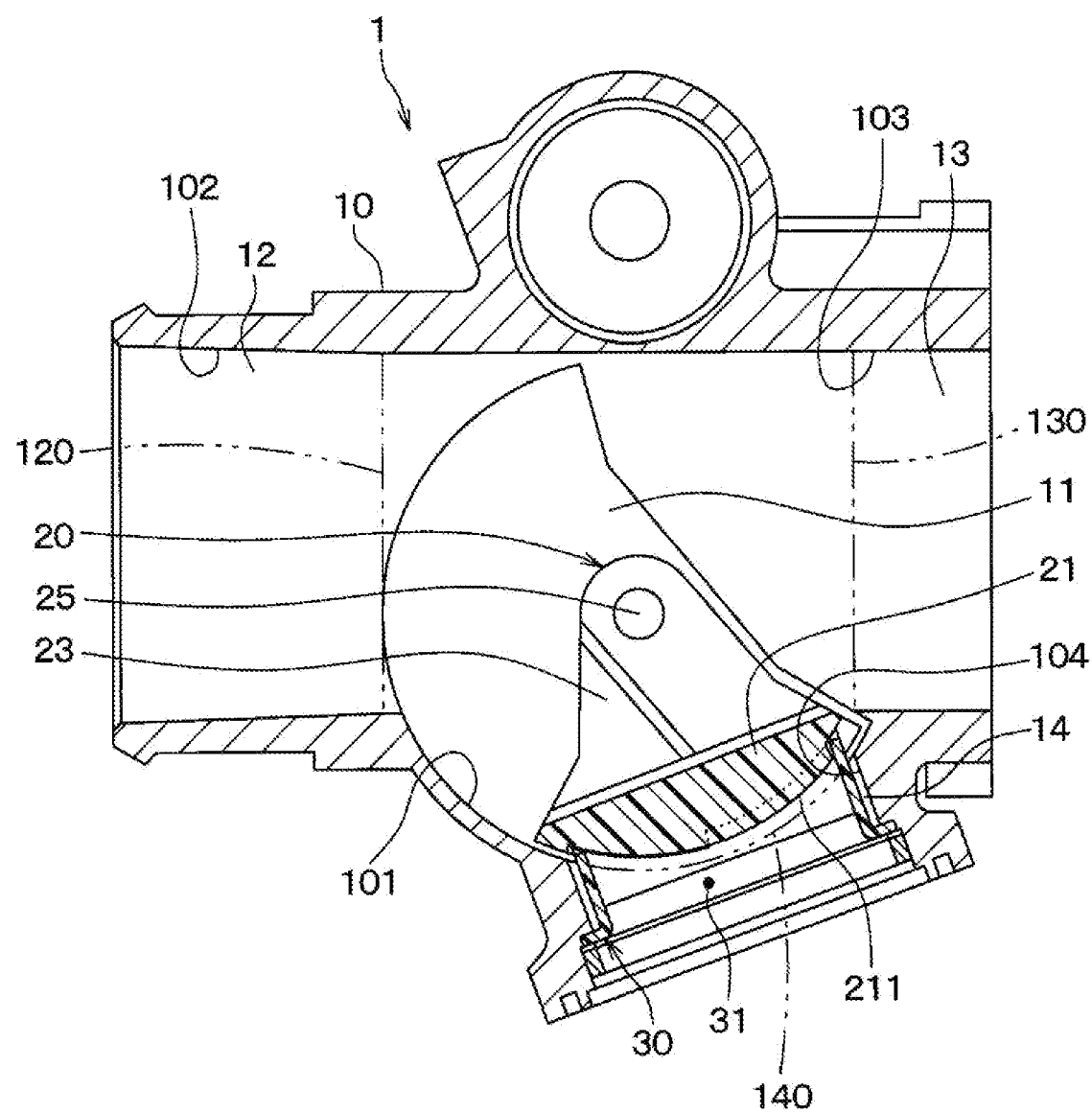
FIG. 4 is a cross-sectional view of the valve device, corresponding to FIG. 3, but the position of a valve member is different from that of FIG. 3.

As shown in FIGS. 2, 3 and 4, the valve device 1 includes a housing 10, a valve member 20, and a valve seat member 30. FIG. 4 shows the same cross section as FIG. 3 of the valve device 1. The position of the valve member 20 in FIG. 4 is different from the position of the valve member 20 in FIG. 3.

The housing 10 forms a confluence of the intake passage 920 and the EGR passage 950. The housing 10 is formed so as to house the valve member 20. The housing 10 is made of only a metal material such as aluminum alloys, or the housing 10 is mainly made of a metal material. The housing 10 may be made of a metal material and another material.

As shown in FIGS. 3 and 4, the housing 10 has a valve-chamber inner wall 101 forming the valve chamber 11, a first passage inner wall 102 forming an upstream passage 12, a second passage inner wall 103 forming a downstream passage 13, and a housing-space inner wall 104 forming a housing space 14. The inner wall is a wall surface on the inner side.

The valve chamber 11 is formed to house the valve member 20 to be rotatable. The upstream passage 12 is formed in communication with the valve chamber 11. The upstream passage 12 is communicated with the air cleaner 923. The downstream passage 13 is formed in communication with the valve chamber 110 separately from the upstream passage 12. The downstream passage 13 is formed coaxially with the upstream passage 12. The downstream passage 13 is in communication with the intercooler 924. The housing space 14 is formed so as to communicate with the valve chamber 11 separately from the upstream passage 12 and the downstream passage 13. The housing space 14 is formed so as to house the valve seat member 30. The housing space 14 is in communication with the EGR passage 950.

The valve member 20 is housed in the valve chamber 11. The valve member 20 opens and closes the valve seat passage 31 of the valve seat member 30. The valve member 20 is provided rotatable relative to the housing 10. The valve member 20 is driven by an electric motor (not shown). Here, for the sake of convenience, the rotation direction of the valve member 20 is defined as follows. When the valve member 20 rotates from the state of FIG. 3 to the state of FIG. 4, the valve member 20 is rotated in a "closing direction to close the EGR passage". When the valve member 20 rotates from the state of FIG. 4 to the state of FIG. 3, the valve member 20 is rotated in an "opening direction to open the EGR passage".

The valve seat member 30 is housed in the housing space 14. The valve seat member 30 is separate from the housing 10. The valve seat member 30 forms the valve seat passage 31 that is opened and closed by the valve member 20. Since the housing space 14 communicates with the EGR passage 950, the valve seat passage 31 communicates with the EGR passage 950.

The valve seat member 30 is made of only a synthetic resin material, or the valve seat member 30 is mainly made of a synthetic resin material. The valve seat member 30 may be made of a synthetic resin material and another material. The synthetic resin material is a synthetic polymer compound other than synthetic fiber and synthetic rubber.

Figure 5:
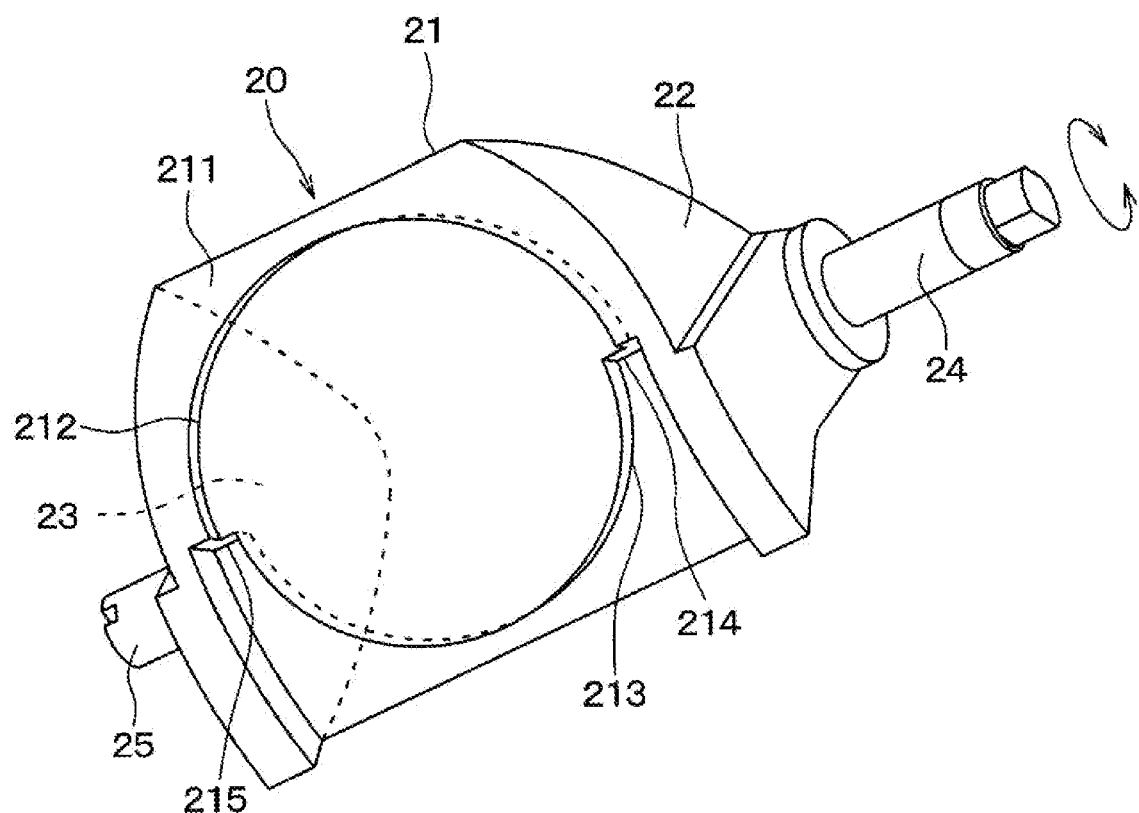
FIG. 5 is a perspective view illustrating the valve member of the valve device of the first embodiment.

As shown in FIG. 5, the valve member 20 includes a valve body 21, an upper arm 22, a lower arm 23, an upper shaft 24, and a lower shaft 25.

The valve body 21 has a tubular shape. The outer wall surface 211 of the valve body 21 is formed so as to have the same shape as a part of outer wall surface of a cylinder in the radial direction. The outer wall surface 211 has seal surfaces 212, 213 and connection sealing surfaces 214, 215.

The seal surfaces 212 and 213 are formed on the outer wall surface 211 so as to face each other in the circumferential direction of the valve body 21. The seal surface 212 is shaped as a part of inner wall surface of a side wall of a cylinder. The seal surface 212 has a semi-cylindrical shape with a central angle of 180 degrees. The seal surface 212 has a radius larger than a radius of the seal surface 213. The seal surface 213 is shaped as a part of outer wall surface of a side wall of a cylinder. The seal surface 213 has a semi-cylindrical shape with a central angle of 180 degrees. A virtual cylindrical surface including the seal surface 212 has a central axis coaxial with a virtual cylindrical surface including the seal surface 213. The central axis is orthogonal to the rotation axis of the valve member 20.

The connection sealing surface 214, 215 is formed orthogonal to the seal surface 212, 213. The normal of the connection sealing surface 214, 215 can be orthogonal to the rotation axis of the valve member 20 when being moved in parallel. The connection sealing surface 214 is located adjacent to the upper arm 22 where the seal surface 212 and the seal surface 213 are connected. The connection sealing surface 215 is located adjacent to the lower arm 23 where the seal surface 212 and the seal surface 213 are connected.

Each of the upper arm 22 and the lower arm 23 is formed in a substantially sector shape. The upper arm 22 is provided at one end of the valve body 21 in the axial direction. The lower arm 23 is provided at the other end of the valve body 21 in the axial direction. The valve body 21, the upper arm 22, and the lower arm 23 are made of only a synthetic resin material such as polyphenylene sulfide, which has high heat resistance. The valve body 21, the upper arm 22, and the lower arm 23 may be mainly made of a synthetic resin material. In other words, the valve body 21, the upper arm 22, and the lower arm 23 may be made of a synthetic resin material and another material.

The upper shaft 24 and the lower shaft 25 are the rotation shaft of the valve member 20. The upper shaft 24 and the lower shaft 25 have substantially rod-shape made of a metal material such as stainless steel. The upper shaft 24 is provided on the upper arm 22. The upper shaft 24 extends in a direction away from the upper arm 22 with respect to the valve body 21. The lower shaft 25 is provided on the lower arm 23. The lower shaft 25 extends in a direction away from the lower arm 23 with respect to the valve body 21. The upper shaft 24 and the lower shaft 25 are rotatably supported by bearings (not shown) provided in the housing 10.

Figure 6:
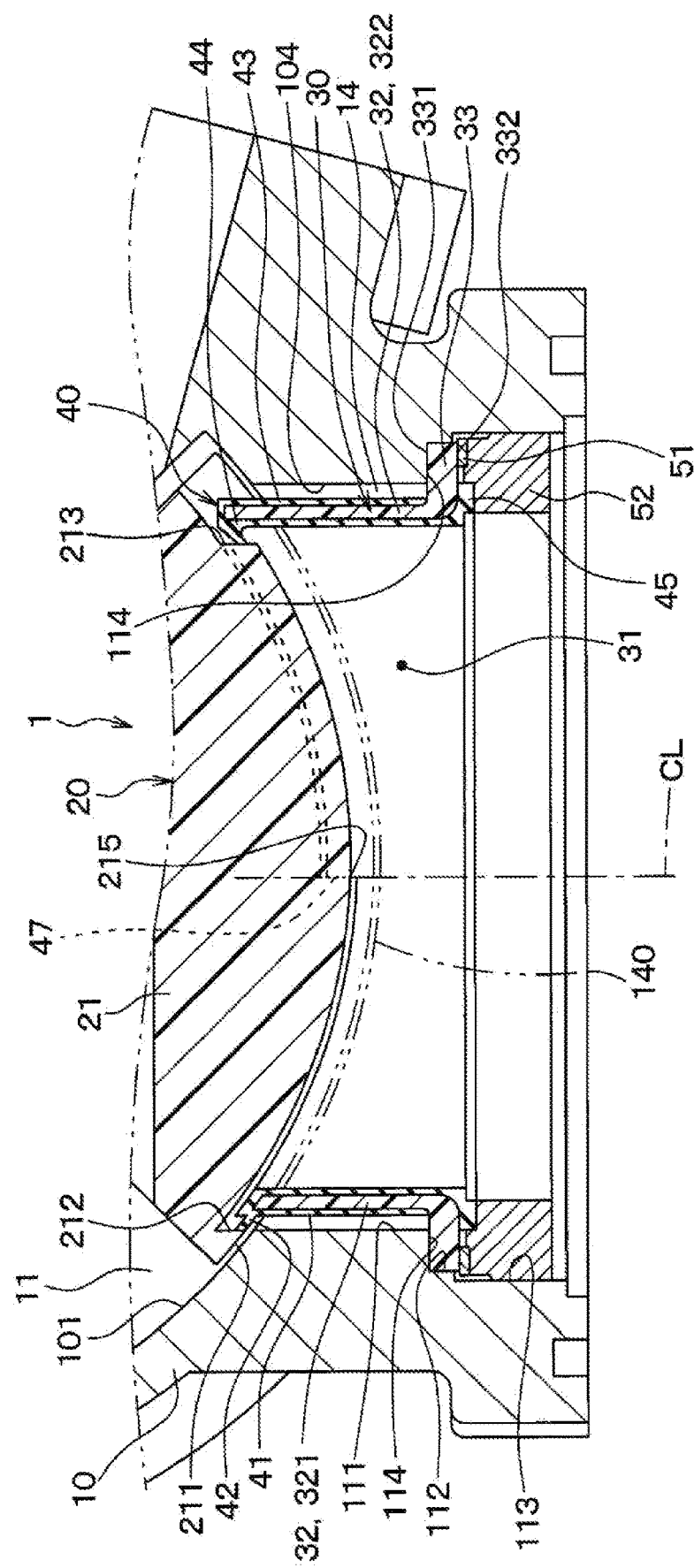
FIG. 6 is a partial cross-sectional view illustrating the valve device of the first embodiment.
Figure 7:
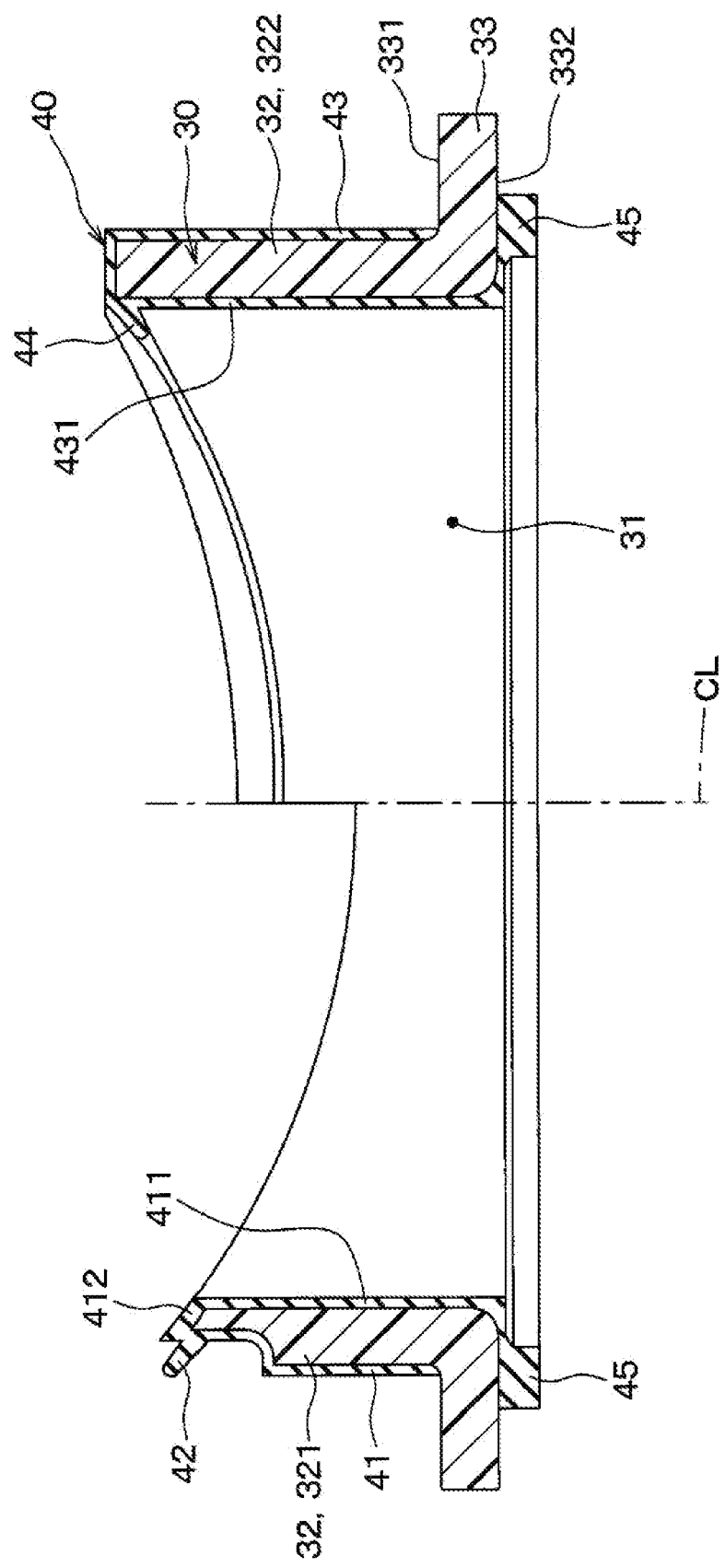
FIG. 7 is a cross-sectional view illustrating a valve seat member of the valve device of the first embodiment.
Figure 8:
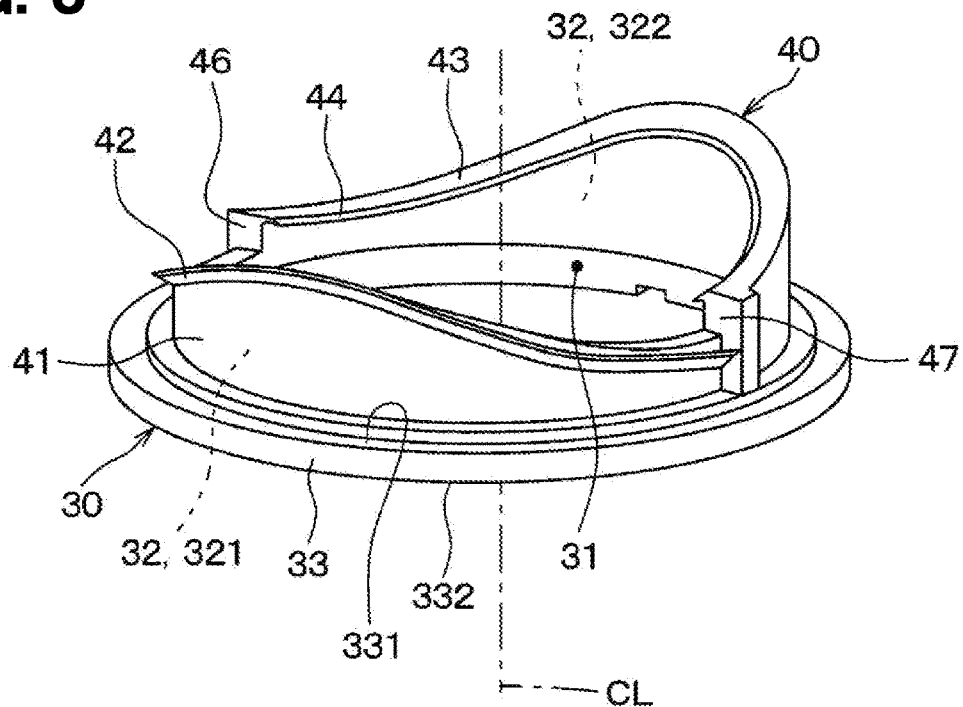
FIG. 8 is a perspective view illustrating the valve seat member of the valve device of the first embodiment.

As shown in FIGS. 6, 7, and 8, the valve seat member 30 has a tubular portion 32 and a flange portion 33. The valve seat passage 31 is formed in the tubular portion 32. The tubular portion 32 extends in a direction parallel to the axis CL, that is, in the axial direction. The flange portion 33 is connected to the tubular portion 32 on the side opposite to the valve chamber 11. The flange portion 33 protrudes outward from the tubular portion 32 in an annular shape. In other words, the flange portion 33 is an annular plate-shaped portion that expands at the end of the valve seat member 30. The axis CL is the center line of the tubular portion 32 and also the center line of the flange portion 33. The flange portion 33 has one surface 331 located on one side of the flange portion 33 in the axial direction and the other surface 332 located on the other side of the flange portion 33 in the axial direction.

The tubular portion 32 has a first side wall portion 321 and a second side wall portion 322. Each of the first side wall portion 321 and the second side wall portion 322 is shaped as a part of a side wall portion of a cylinder. Each of the first side wall portion 321 and the second side wall portion 322 is formed to have the central angle of 180 degrees. The height of the first side wall portion 321 in the axial direction is smaller than the height of the second side wall portion 322 in the axial direction.

The valve device 1 includes a seal member 40. The seal member 40 covers most of the valve seat member 30. A part of the one surface 331 of the flange portion 33 that is in contact with a step surface 114, which will be described later, is not covered by the seal member 40 and is exposed from the seal member 40. A part of the other surface 332 of the flange portion 33 that is in contact with a wave washer 51, which will be described later, is not covered by the seal member 40 and is exposed from the seal member 40.

The seal member 40 has a first covering portion 41, a first protruding portion 42, a second covering portion 43, a second protruding portion 44, and a third covering portion 45.

The first covering portion 41 covers the first side wall portion 321. Specifically, the first covering portion 41 covers the radially inner side, the radially outer side, and the end portion of the first side wall portion 321 opposite to the flange portion 33.

The first protruding portion 42 is provided on the first side wall portion 321 adjacent to the valve chamber 11. That is, the first protruding portion 42 is provided at the end of the first covering portion 41 opposite to the flange portion 33. The first protruding portion 42 has a shape protruding outward from the first covering portion 41 in the radial direction of the flange portion 33. The first protruding portion 42 is in contact with the valve body 21, and corresponds to a valve-side seal portion that closes the gap between the valve body 21 and the valve seat member 30.

The second covering portion 43 covers the second side wall portion 322. Specifically, the second covering portion 43 covers the radially inner side, the radially outer side, and the end portion of the second side wall portion 322 opposite to the flange portion 33. Further, the second covering portion 43 covers an end surface of a connection between the second side wall portion 322 and the first side wall portion 321. As shown in FIG. 8, the second covering portion 43 has sealing surfaces 46 and 47 at positions covering the end surface connected to the first side wall portion 321. The sealing surface 46, 47 is connected to the first protruding portion 42.

The second protruding portion 44 is provided on the second side wall portion 322 adjacent to the valve chamber 11. That is, the second protruding portion 44 is provided at the end of the second covering portion 43 opposite to the flange portion 33. The second protruding portion 44 has a shape protruding inward in the radial direction of the flange portion 33 from the second covering portion 43. The second protruding portion 44 is connected to the sealing surfaces 46 and 47. The second protruding portion 44 corresponds to a valve-side seal portion that closes the gap between the valve body 21 and the valve seat member 30 by coming into contact with the valve body 21.

The third covering portion 45 is an annular portion that covers a part of the other surface 332 of the flange portion 33, and is located radially inner side of the flange portion 33. The third covering portion 45 is housed in the housing space 14, and corresponds to an annular housing-side seal portion that blocks a flow of fluid between the valve seat member 30 and the housing-space inner wall 104.

The seal member 40 is made of only a rubber material. In this embodiment, synthetic rubber is used as the rubber material. However, natural rubber may be used as the rubber material. The seal member 40 may be mainly made of a rubber material. The seal member 40 may be made of a rubber material and another material. The seal member 40 is integrally molded with the valve seat member 30. That is, the seal member 40 and the valve seat member 30 are configured as an integrally molded product in which the seal member 40 is integrally molded with the valve seat member 30, for example, by integrally molding at the same time as joining members without using secondary bonding or mechanical joining.

As shown in FIG. 7, the third covering portion 45 is seamlessly continuous with the first protruding portion 42 via a radially inner portion 411 and an opposite end portion 412 of the first covering portion 41. The radially inner portion 411 covers the radially inner side of the first side wall portion 321. The opposite end portion 412 covers the end portion of the first side wall portion 321 opposite to the flange portion 33. Similarly, the third covering portion 45 is seamlessly continuous with the second protruding portion 44 via a radially inner portion 431 of the second covering portion 43 that covers the radially inner side of the second side wall portion 322. Therefore, the radially inner portion 411 of the first covering portion 41 that covers the radially inner side of the first side wall portion 321 and the opposite end portion 412 that covers the end portion of the first side wall portion 321 correspond to a connector connecting the valve-side seal portion and the housing-side seal portion. The radially inner portion 431 of the second covering portion 43 that covers the radially inner side of the second side wall portion 322 corresponds to a connector that connects the valve-side seal portion and the housing-side seal portion.

As shown in FIG. 6, the housing-space inner wall 104 of the housing 10 includes a first wall surface 111, a second wall surface 112, a third wall surface 113, and a step surface 114. Each of the first wall surface 111, the second wall surface 112, and the third wall surface 113 is shaped as an inner surface of a side wall of a cylinder.

The first wall surface 111 of the housing-space inner wall 104 is the closest to the valve chamber 11. The second wall surface 112 of the housing-space inner wall 104 is distant from the valve chamber 11 than the first wall surface 111 is. The opening width of the second wall surface 112 is larger than the opening width of the first wall surface 111. The third wall surface 113 of the housing-space inner wall 104 is distant from the valve chamber 11 than the second wall surface 112 is. The opening width of the third wall surface 113 is larger than the opening width of the second wall surface 112.

The step surface 114 of the housing-space inner wall 104 is located between the first wall surface 111 and the second wall surface 112, and is connected to both the first wall surface 111 and the second wall surface 112. The step surface 114 is formed by the difference in opening width between the first wall surface 111 and the second wall surface 112.

The valve seat member 30 is housed in the housing space 14 in a state where the one surface 331 of the flange portion 33 is in contact with the step surface 114. At this time, the step surface 114 and the one surface 331 of the flange portion 33 face each other in the axial direction along the axis CL of the flange portion 33. The step surface 114 corresponds to an annular facing surface facing the flange portion 33 in the axial direction along the axis CL of the flange portion.

As shown in FIG. 6, the valve device 1 includes a wave washer 51 and a fixing ring 52. The wave washer 51 and the fixing ring 52 are housed in the housed space 14 adjacent to the other surface 332 of the flange portion 33.

Figure 9:
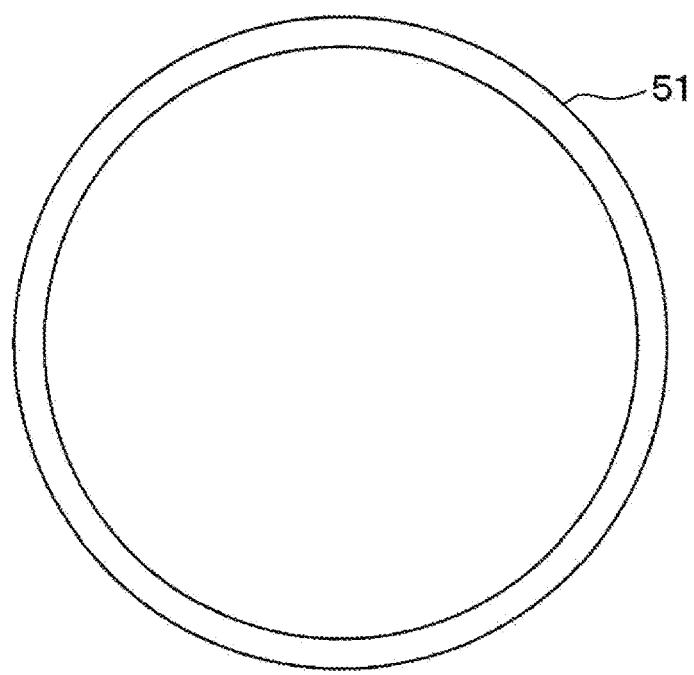
FIG. 9 is a plan view illustrating a wave washer of the valve device of the first embodiment.
Figure 10:
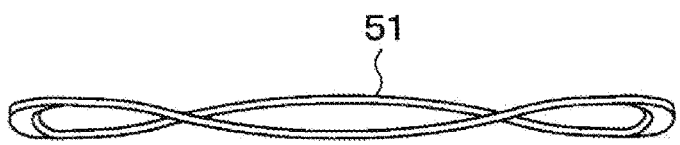
FIG. 10 is a side view illustrating the wave washer of the valve device of the first embodiment.

As shown in FIGS. 9 and 10, the wave washer 51 is a wavy annular plate. The wave washer 51 is a spring member for pressing the valve seat member 30 against the housing 10 by utilizing the reaction force generated during elastic deformation. The spring constant of the wave washer 51 is larger than the spring constant of the third covering portion 45. The wave washer 51 is made of only a metal material such as stainless steel. The wave washer 51 may be mainly made of a metal material. The wave washer 51 may be composed of a metal material and another material.

Figure 11:
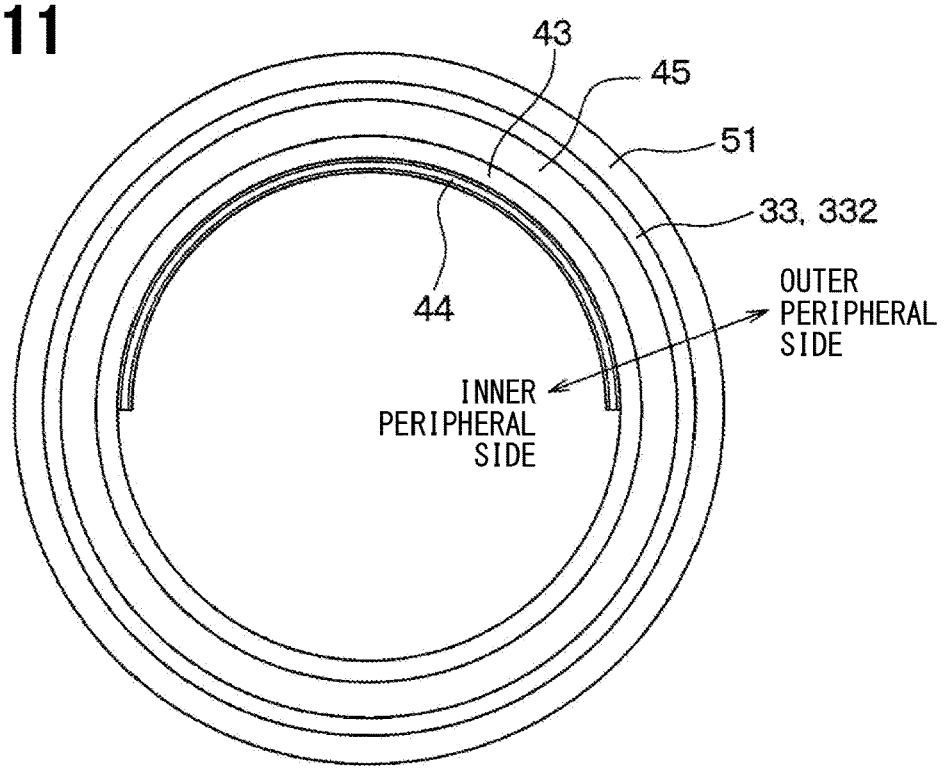
FIG. 11 is a front view illustrating the valve seat member of the first embodiment when the valve seat member is viewed from a flange portion side.

As shown in FIG. 11, the wave washer 51 is disposed on the other surface 332 of the flange portion 33, and is located on the outer peripheral side with respect to the third covering portion 45. The outer peripheral side means the outer side in the radial direction of the flange portion 33. FIG. 11 is a front view illustrating the valve seat member 30 as viewed from the flange portion 33 side with the wave washer 51 installed on the other surface 332 of the flange portion 33. The wave washer 51 is in contact with the other surface 332 of the flange portion 33. The wave washer 51 does not overlap with the third covering portion 45 in the direction along the axis CL.

The fixing ring 52 is an annular plate. The thickness of the fixing ring 52 is larger than the thickness of the wave washer 51. The radial width of the fixing ring 52 is larger than the radial width of the wave washer 51. The fixing ring 52 is made of only a metal material such as aluminum alloys. The fixing ring 52 may be mainly made of a metal material. The fixing ring 52 may be made of a metal material and another material.

The fixing ring 52 is a fixing member that fixes the valve seat member 30 to the housing 10. The fixing ring 52 is press-fitted against the housing-space inner wall 104 so as to press the flange portion 33 against the step surface 114 via the third covering portion 45 and the wave washer 51. As a result, the valve seat member 30 is fixed to the housing 10. That is, the valve seat member 30 is fixed to the housing 10 by being supported between the step surface 114 and the fixing ring 52 in the direction along the axis CL.

At this time, the wave washer 51 is interposed between the flange portion 33 and the fixing ring 52 in a state of being elastically deformed in the direction along the axis CL. Therefore, a reaction force is generated in the wave washer 51 against an external force that elastically deforms the wave washer 51. By applying this reaction force to the flange portion 33, the flange portion 33 is pressed against the step surface 114.

Further, the third covering portion 45 is interposed between the flange portion 33 and the fixing ring 52 in a compressed state being elastically deformed so that the space between the flange portion 33 and the fixing ring 52 becomes airtight. Therefore, the space between the flange portion 33 and the fixing ring 52 is in an airtight state.

Since the fixing ring 52 is press-fitted into the housing-space inner wall 104, the space between the fixing ring 52 and the housing-space inner wall 104 is in an airtight state. Alternatively, the space between the fixing ring 52 and the housing-space inner wall 104 may be in an airtight state by welding the fixing ring 52 to the housing-space inner wall 104.

[Operation of Valve Device]

Next, the operation of the valve device 1 will be described. As shown in FIGS. 3 and 4, in the valve member 20, the outer wall surface 211 of the valve body 21 rotates and moves between the opening 120 of the upstream passage 12 adjacent to the valve chamber 11 and the opening 140 of the housing space 14 adjacent to the valve chamber 11.

Specifically, as shown in FIG. 3, when the valve member 20 rotates in the opening direction for opening the EGR passage, the valve member 20 is located at the opening 120 of the upstream passage 12 and opens the valve seat passage 31. That is, the valve member 20 minimizes the upstream passage 12 with respect to the valve chamber 11 while maximally opening the EGR passage 950 communicating with the housing space 14 with respect to the valve chamber 11.

Further, as shown in FIG. 4, when the valve member 20 rotates in the closing direction for closing the EGR passage, the valve member 20 is located at the opening 140 of the housing space 14 and closes the valve seat passage 31. That is, the valve member 20 fully closes the EGR passage 950 with respect to the valve chamber 11 and opens the upstream passage 12 with respect to the valve chamber 11 to the maximum extent.

Figure 12A:
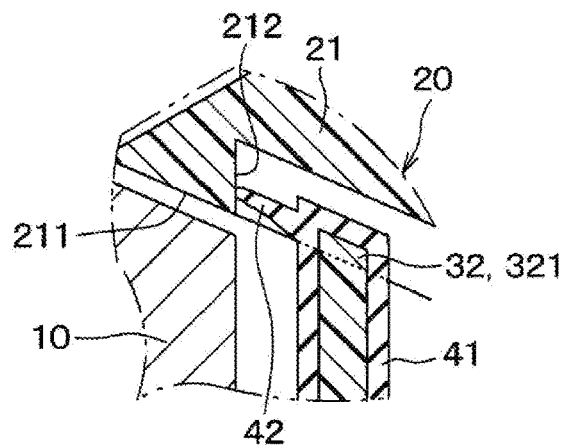
FIG. 12A is a partial cross-sectional view illustrating the valve device of the first embodiment, in which a first protruding portion is in contact with a sealing surface of the valve member.
Figure 12B:
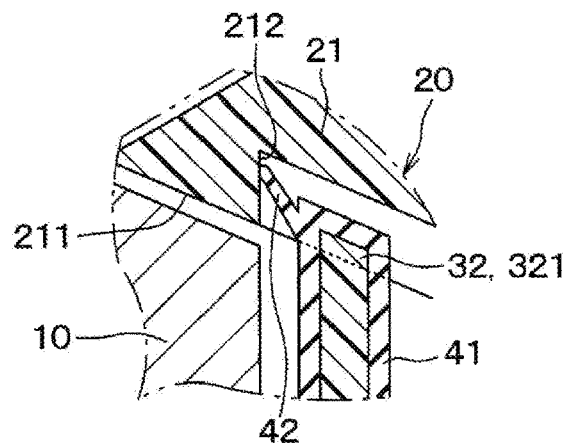
FIG. 12B is a partial cross-sectional view illustrating the valve device of the first embodiment, in which the first protruding portion is tilted by the sealing surface of the valve member.

Here, the state of contact between the seal member 40 and the valve body 21 when the valve member 20 closes the valve seat passage 31 will be described. When the valve member 20 is rotated in the closing direction, the seal surfaces 212 and 213 come into contact with the first protruding portion 42 and the second protruding portion 44, respectively, as shown in FIG. 6. Further, when the valve member 20 is rotated in the closing direction, as shown in FIGS. 12A and 12B, the first protruding portion 42 is elastically deformed, while being pressed against the seal surface 212, and is tilted down. Similarly, although not shown, the second protruding portion 44 is elastically deformed, while being pressed against the seal surface 213, and is tilted down.

Further, as shown in FIG. 6, the connection sealing surfaces 214 and 215 come into contact with the sealing surfaces 46 and 47, respectively, and compress the second covering portion 43. FIG. 6 shows the connection sealing surface 215 and the sealing surface 47, but does not show the connection sealing surface 214 and the sealing surface 46. As a result, the exhaust passage 930 and the valve chamber 11 are shut off from each other.

In this way, in the valve device 1, the EGR passage 950 can be opened and closed by rotating the valve member 20, and the opening degree of the EGR passage 950 with respect to the intake passage 920 can be increased or decreased. The gas flowing through the EGR passage 950 flows into the intake passage 920 due to the negative pressure of the intake passage 920.

Next, the effect of this embodiment will be described.

(1) In the present embodiment, as shown in FIG. 6, the third covering portion 45 is interposed between the flange portion 33 and the fixing ring 52.

Figure 13:
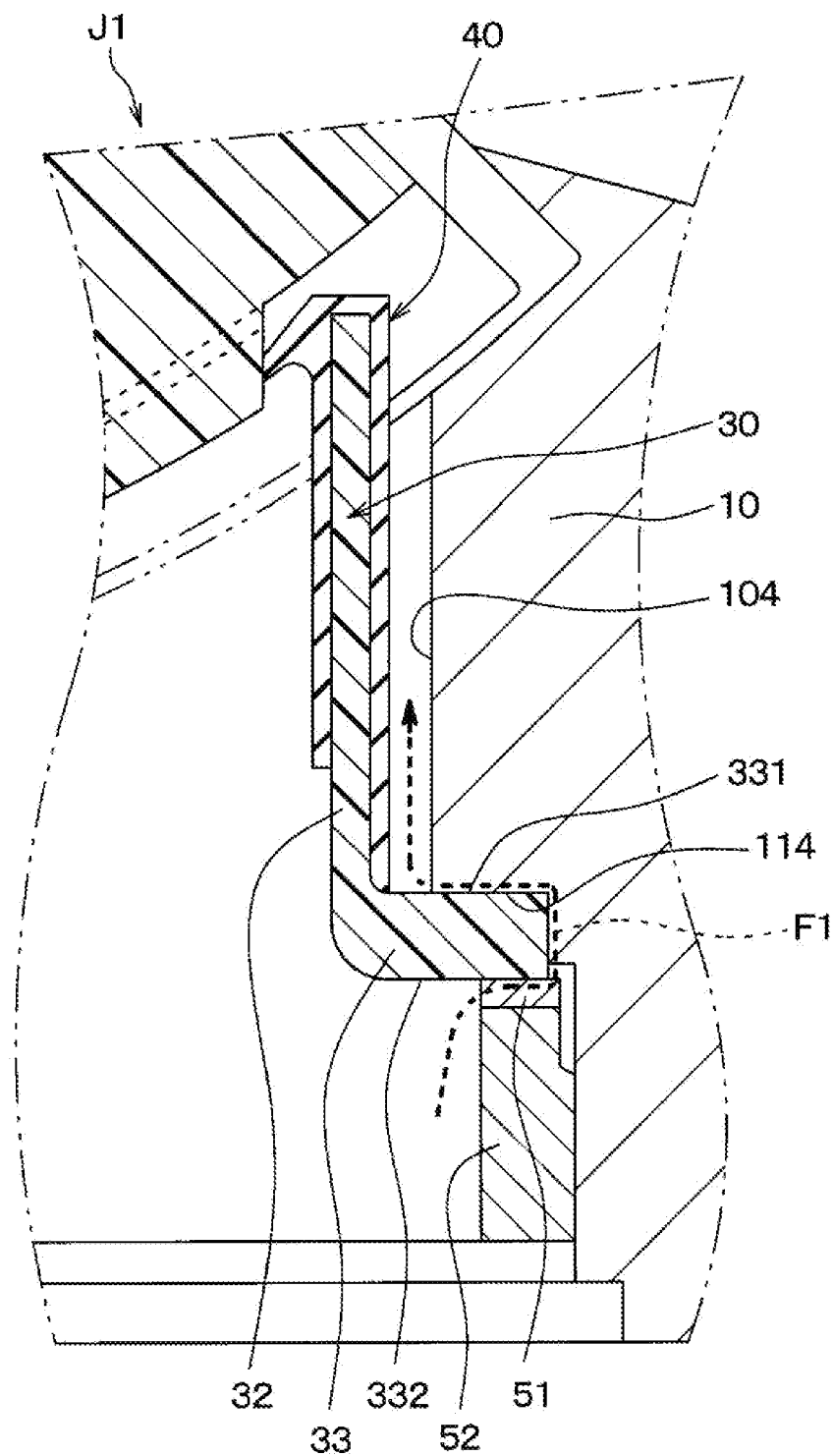
FIG. 13 is a partial cross-sectional view illustrating a valve device of Comparative Example 1.

Here, the valve device 1 of the present embodiment is compared with a valve device J1 of Comparative Example 1 shown in FIG. 13. The valve device J1 of Comparative Example 1 is different from the valve device 1 of the present embodiment in that the valve device J1 does not have the third covering portion 45. The other configuration of the valve device J1 of Comparative Example 1 is substantially the same as that of the valve device 1 of the present embodiment.

In the valve device J1 of Comparative Example 1, only the wave washer 51 is interposed between the flange portion 33 and the fixing ring 52. Therefore, although not shown in FIG. 13, the wave washer 51 creates a gap between the flange portion 33 and the fixing ring 52.

In the valve device J1 of Comparative Example 1, one surface 331 of the flange portion 33 is in contact with the step surface 114. As a result, a sealing is provided between the valve seat member 30 and the housing 10.

However, if at least one of the step surface 114 and the one surface 331 of the flange portion 33 has low flatness, a gap is formed between the step surface 114 and the flange portion 33. In general, a processing for making the surface flat is not performed on the surface of synthetic resin parts, but is performed on the surface of metal parts. Therefore, when the valve seat member 30 is made of a synthetic resin material and the housing 10 is made of a metal material, the flatness of the one surface 331 of the flange portion 33 is lower than the flatness of the step surface 114. Further, there is a possibility that a gap may be generated between the flange portion 33 and the step surface 114 due to vibration while the vehicle is travelling.

In these cases, when the valve member 20 closes the valve seat passage 31, the exhaust gas can pass through the gap between the flange portion 33 and the fixing ring 52 and the gap between the step surface 114 and the flange portion 33. Therefore, as shown by the arrow F1 in FIG. 13, the exhaust gas flows between the valve seat member 30 and the housing 10, and leaks into the valve chamber 11. As described above, in the valve device J1 of Comparative Example 1, the present inventors have found an issue that the sealing property between the valve seat member 30 and the housing 10 is low.

In contrast, according to the present embodiment, the third covering portion 45 can restrict the flow of fluid between the flange portion 33 and the fixing ring 52. Further, the fixing ring 52 is fixed to the housing-space inner wall 104 in an airtight state between the fixing ring 52 and the housing-space inner wall 104. Therefore, it is possible to restrict the flow of fluid between the valve seat member 30 and the housing 10. That is, the sealing property between the valve seat member 30 and the housing 10 can be improved.

(2) In the present embodiment, the wave washer 51 is interposed between the flange portion 33 and the fixing ring 52 at a position on the outer peripheral side of the third covering portion 45. The spring constant of the wave washer 51 is larger than the spring constant of the third covering portion 45.

Here, in order to fix the valve seat member 30 to the housing 10, it is preferable to press the flange portion 33 against the step surface 114 with a load of a certain level or more.

However, unlike the present embodiment, if only the third covering portion 45 is interposed between the flange portion 33 and the fixing ring 52, the flange portion 33 cannot be pressed with a load of a certain amount or more due to deterioration of the third covering portion 45. In this case, the valve seat member 30 rotates, and the position of the valve seat member 30 with respect to the housing 10 shifts. The position of the valve seat member 30 with respect to the valve body 21 is displaced. Therefore, when the valve body 21 is located at the position where the valve seat passage 31 is closed, the sealing between the valve body 21 and the valve seat member 30 cannot be performed. If only the third covering portion 45 is interposed between the flange portion 33 and the fixing ring 52 in this way, the valve seat member 30 cannot be maintained in the fixed state fixed to the housing 10.

In contrast, according to the present embodiment, the flange portion 33 can be pressed against the step surface 114 with a load of a certain level or more by utilizing the reaction force generated when the wave washer 51 is elastically deformed. Further, the wave washer 51 is made of a metal material. In general, metal materials have less deterioration in the elastic property than rubber materials. Therefore, the wave washer 51 has less elastic deterioration than the third covering portion 45. Therefore, as compared with the case where only the third covering portion 45 is interposed between the flange portion 33 and the fixing ring 52, the flange portion 33 can be continuously pressed against the step surface 114 with a load of a certain level or more. It is possible to maintain the fixation of the valve seat member 30 to the housing 10.

The fact that the metal material has less deterioration in the elastic property than the rubber material means that a ratio of decrease in reaction force with respect to the compression load is smaller in metal material than in rubber material, when a compression load of the same magnitude is continuously applied to the two materials for the same period. The comparison of deterioration in the elastic property is performed by a stress relaxation test of a rubber material specified in JIS K6263.

Further, in the present embodiment, the wave washer 51 is arranged on the outer peripheral side of the third covering portion 45. However, the wave washer 51 may be arranged on the inner peripheral side of the third covering portion 45. The inner peripheral side means the inner side of the flange portion 33 in the radial direction.

Figure 14:
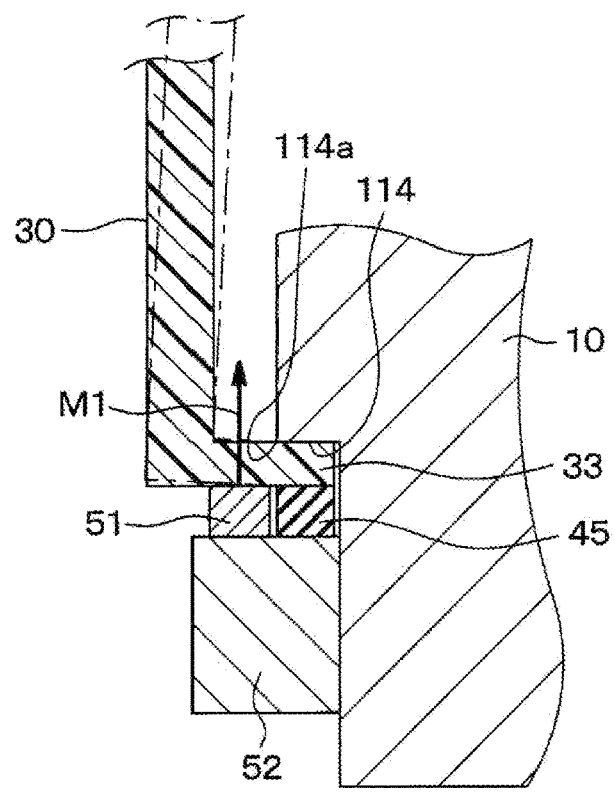
FIG. 14 is a schematic view for explaining a moment acting on a flange portion in a first arrangement of the valve device of the first embodiment.
Figure 15:
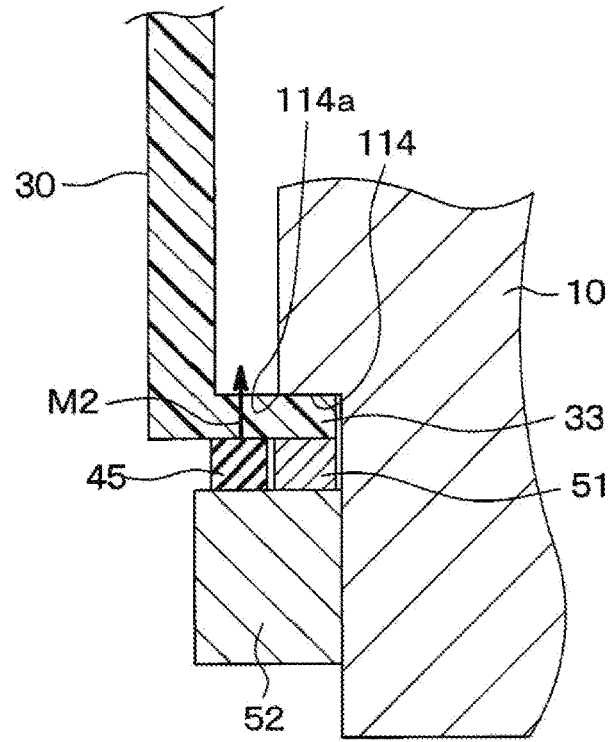
FIG. 15 is a schematic view for explaining a moment acting on a flange portion in a second arrangement of the valve device of the first embodiment.

(3) A moment M1 in the first arrangement example shown in FIG. 14 and a moment M2 in the second arrangement example shown in FIG. 15 are compared with each other.

FIG. 14 is a schematic view for explaining the moment M1 acting on the flange portion 33 around the contact end 114a in the first arrangement example. In the first arrangement example, unlike the present embodiment, the wave washer 51 is arranged on the inner peripheral side of the third covering portion 45. The wave washer 51 is arranged on the inner peripheral side of the contact end 114a.

FIG. 15 is a schematic view for explaining the moment M2 acting on the flange portion around the contact end in the second arrangement example. In the second arrangement example, the wave washer 51 is arranged on the outer peripheral side of the third covering portion 45 as in the present embodiment. The third covering portion 45 is arranged on the inner peripheral side of the contact end 114a.

In FIGS. 14 and 15, only the third covering portion 45 of the seal member 40 is shown. As shown in FIGS. 14 and 15, the step surface 114 of the housing 10 has the contact end 114a which is an inner peripheral end of a region in contact with the flange portion 33.

Each of the moments M1 and M2 is represented by a product of the force applied to the part of the flange portion 33 on the inner peripheral side of the contact end 114a and the distance from the contact end 114a to the central part of the flange portion 33 to which the force is applied. The above-mentioned force in the first arrangement example is a reaction force of the wave washer 51 generated by elastic deformation. The above-mentioned force in the second arrangement example is a reaction force of the third covering portion 45 generated by elastic deformation. It is assumed that the distance in the first arrangement example and the distance in the second arrangement example are the same.

According to Hooke's law, the reaction force of a spring caused by elastic deformation is expressed as a product of the spring constant and the amount of deformation of the spring. When the amount of deformation of the spring is the same, the larger the spring constant, the larger the reaction force of the spring. The spring constant of the wave washer 51 used in the present embodiment is larger than the spring constant of the third covering portion 45. Therefore, when the amount of compression deformation of the wave washer 51 in the first arrangement example and the amount of compression deformation of the third covering portion 45 in the second arrangement example are the same, the reaction force generated in the wave washer 51 is larger than the reaction force generated in the third covering portion 45. Therefore, the moment M1 of the first arrangement example is larger than the moment M2 of the second arrangement example.

As a result, in the first arrangement example, as shown by the alternate long and short dash line in FIG. 14, the valve seat member 30 is likely to be deformed. That is, the end portion of the valve seat member 30 adjacent to the valve member 20 tends to move outward in the radial direction of the valve seat member 30. When the valve seat member 30 is deformed, the sealing property between the valve member 20 and the valve seat member 30 deteriorates. On the other hand, in the second arrangement example, the valve seat member 30 is less likely to be deformed than in the first arrangement example.

In the above description, the amount of compression deformation of the wave washer 51 in the first arrangement example and the amount of compression deformation of the third covering portion 45 in the second arrangement example are the same. However, even when the amount of compression deformation is different, in the first arrangement example of FIG. 14, the flange portion 33 is likely to be deformed when the reaction force generated in the wave washer 51 located on the inner peripheral side of the contact end 114a is larger than the reaction force generated in the third covering portion 45 located on the outer peripheral side of the wave washer 51.

Therefore, in the present embodiment, as shown in FIG. 6, the wave washer 51 having a spring constant larger than that of the third covering portion 45 is arranged on the outer peripheral side of the third covering portion 45. As shown in FIG. 15, the third covering portion 45 is arranged on the inner peripheral side of the contact end 114a. The third covering portion 45 and the wave washer 51 are interposed between the flange portion 33 and the fixing ring 52 so that the reaction force generated in the wave washer 51 due to the elastic deformation is smaller than the reaction force generated by the third covering portion 45.

Accordingly, the moment acting to the flange portion 33 around the contact end 114a can be reduced as compared with the case where the wave washer 51 is arranged on the inner peripheral side of the third covering portion 45 and is arranged on the inner peripheral side of the contact end 114a. Therefore, the deformation of the flange portion 33 can be suppressed.

The "reaction force generated in the wave washer 51 due to elastic deformation" is obtained from the spring constant of the wave washer 51 and the amount of deformation of the wave washer 51. The amount of deformation of the wave washer 51 is measured by comparing the shape of the wave washer 51 before removing the fixing ring 52 with the shape of the wave washer 51 after removing the fixing ring 52. Similarly, the "reaction force generated in the third covering portion 45 due to elastic deformation" is obtained from the spring constant of the third covering portion 45 and the amount of deformation of the third covering portion 45. The amount of deformation of the third covering portion 45 is measured by comparing the shape of the third covering portion 45 before removing the fixing ring 52 with the shape of the third covering portion 45 after removing the fixing ring 52.

Further, in the present embodiment, all of the third covering portion 45 is arranged on the inner peripheral side of the contact end 114a. However, a part of the third covering portion 45 may be arranged on the inner peripheral side of the contact end 114a, and the other part of the third covering portion 45 may be arranged on the outer peripheral side of the contact end 114a. In this way, at least a part of the third covering portion 45 is arranged on the inner peripheral side of the contact end 114a. As a result, the effect of (3) can be obtained.

(4) In the present embodiment, as shown in FIG. 7, the third covering portion 45, the radially inner portion 411 and the opposite end portion 412 of the first covering portion 41, the first protruding portion 42, the radially inner portion 431 of the second covering portion 43, and the second protruding portion 44 are formed at the same time, so as to be made of the same material and are seamlessly continuous. By molding these at the same time, the third covering portion 45 and the valve seat member 30 are configured as an integrally molded product in which the third covering portion 45 is integrally molded with the valve seat member 30.

Accordingly, the number of parts can be reduced as compared with the case where the third covering portion 45 and the valve seat member 30 are configured as separate bodies.

Second Embodiment

Figure 16:
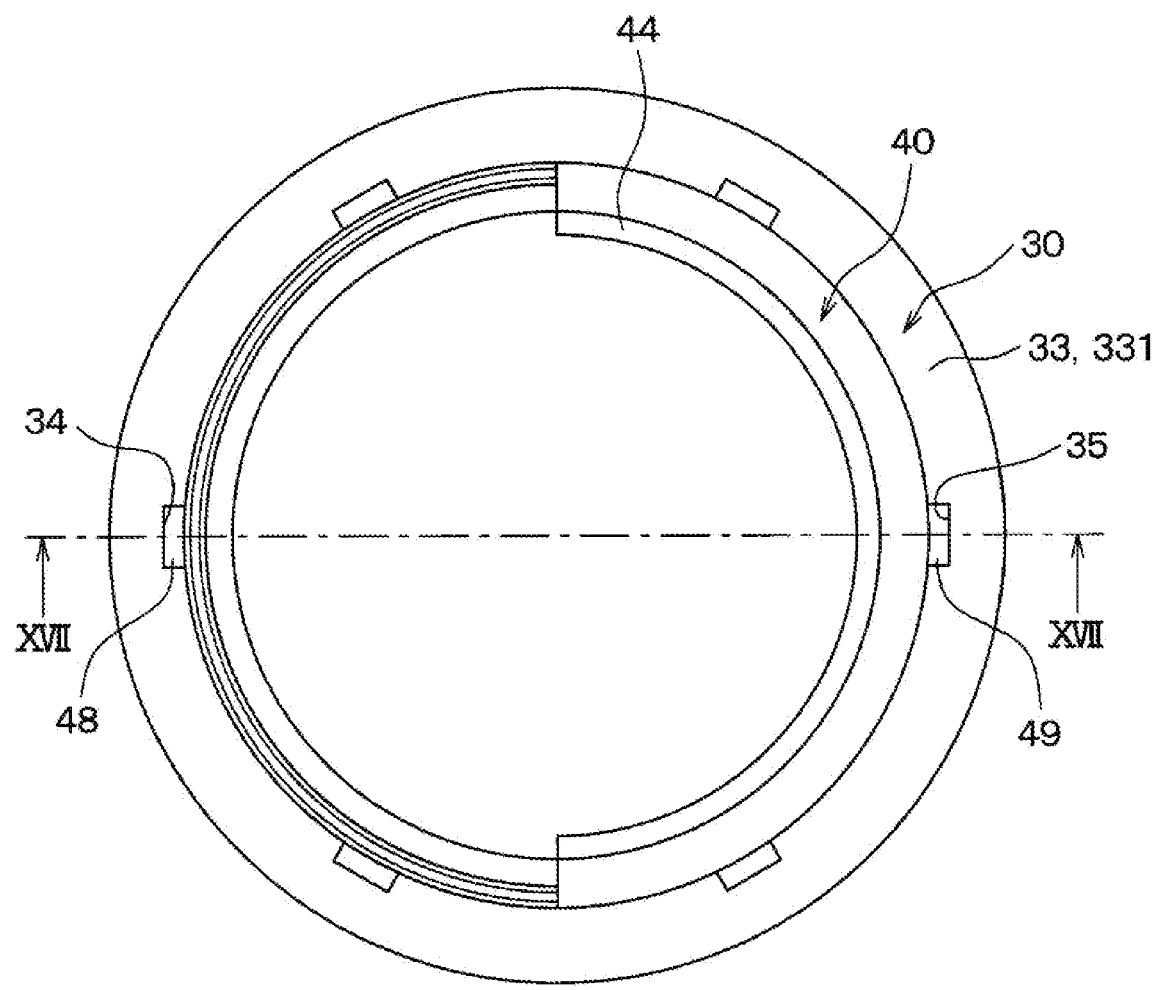
FIG. 16 is a front view illustrating a valve seat member of a second embodiment when the valve seat member is viewed from a side opposite to a flange portion.
Figure 17:
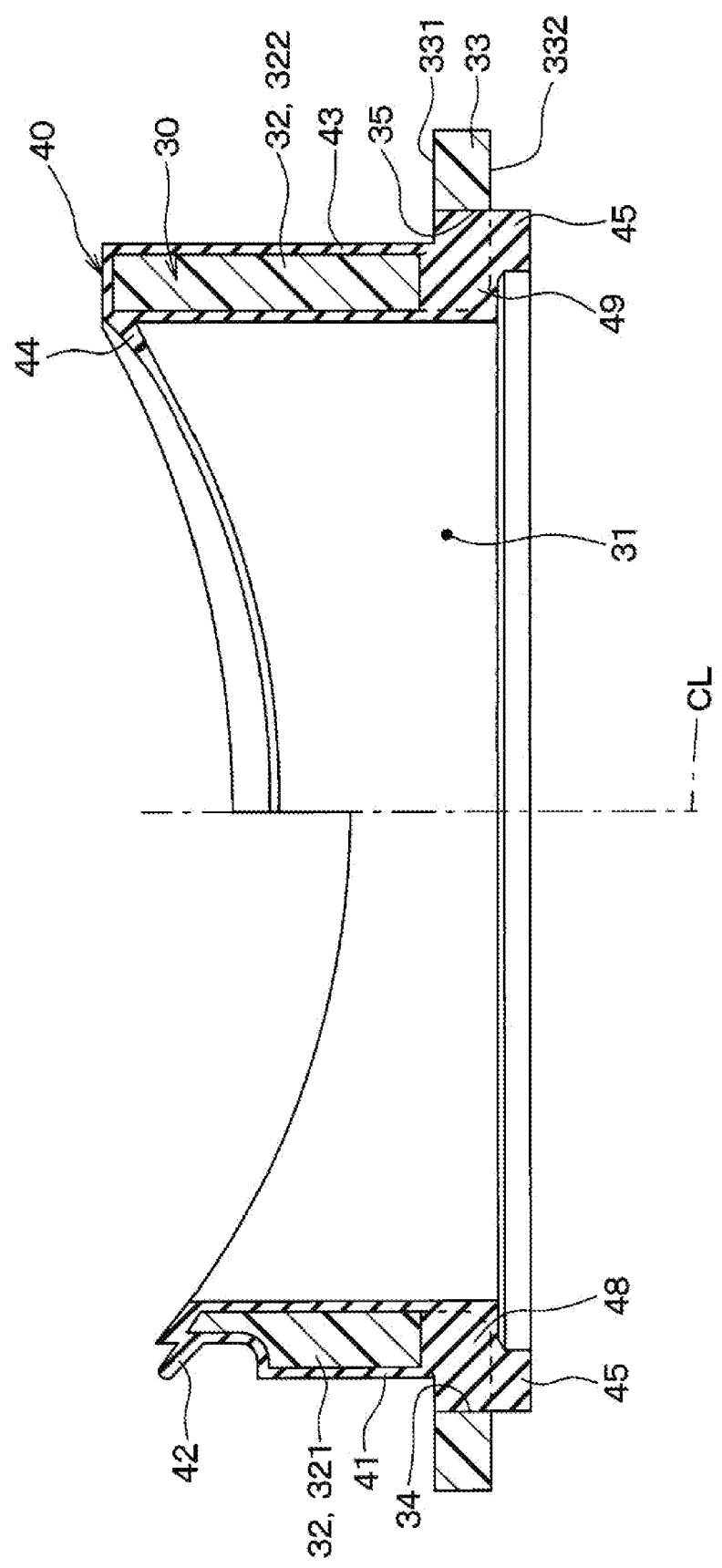
FIG. 17 is a cross-sectional view taken along a line XVII-XVII in FIG. 16.

As shown in FIGS. 16 and 17, in a second embodiment, a first opening 34 is formed in the first side wall portion 321 and the flange portion 33 of the valve seat member 30. A second opening 35 is formed in the second side wall portion 322 and the flange portion 33 of the valve seat member 30.

The seal member 40 has a first filling portion 48 filled in the first opening 34 and a second filling portion 49 filled in the second opening 35. The first protruding portion 42, the first covering portion 41, the first filling portion 48, and the third covering portion 45 are made of the same material and are seamlessly continuous. Similarly, the second protruding portion 44, the second covering portion 43, the second filling portion 49 and the third covering portion 45 are made of the same material and are seamlessly continuous.

In the present embodiment, the first covering portion 41, the first filling portion 48, the second covering portion 43, and the second filling portion 49 correspond to a connector that connects the valve-side seal portion and the housing-side seal portion. The connector connects the valve-side seal portion and the housing-side seal portion through an opening including the first opening 34 and the second opening 35.

The first protruding portion 42, the first covering portion 41, the first filling portion 48, the second protruding portion 44, the second covering portion 43, the second filling portion 49, and the third covering portion 45 are molded at the same time. As a result, the third covering portion 45 and the valve seat member 30 are configured as an integrally molded product in which the third covering portion 45 is integrally molded with the valve seat member 30. Therefore, the effect (4) of the first embodiment can be obtained also by this embodiment.

The other configuration of the valve device 1 is the same as that of the first embodiment. Therefore, the effects (1), (2), and (3) of the first embodiment can be obtained also by this embodiment.

Third Embodiment

Figure 18:
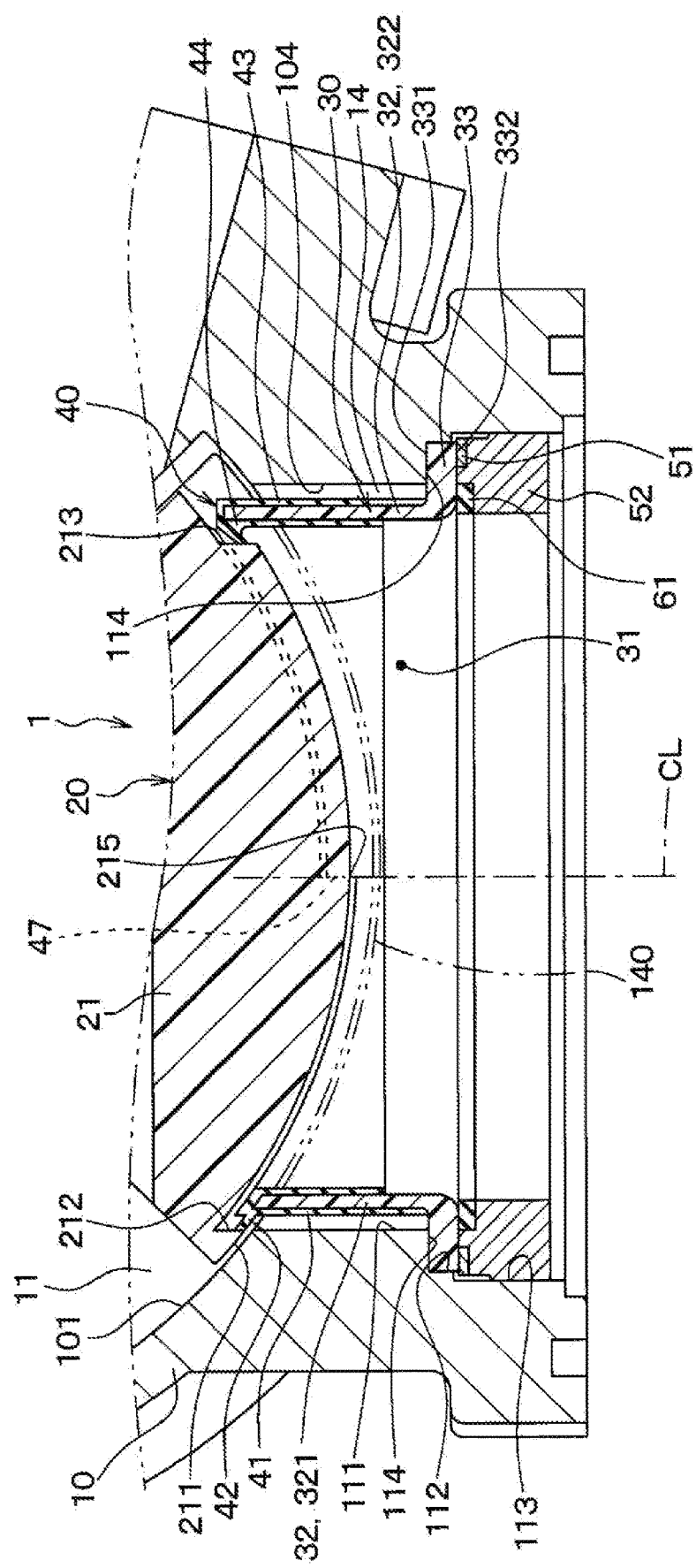
FIG. 18 is a partial cross-sectional view illustrating a valve device of a third embodiment.

As shown in FIG. 18, the valve device 1 of the present embodiment has a seal ring 61 instead of the third covering portion 45 of the first embodiment.

The seal ring 61 corresponds to the third covering portion 45 of the first embodiment. The seal ring 61 is not continuous with the seal member 40. The seal ring 61 is configured as a separate body from the seal member 40 and the valve seat member 30. The seal ring 61 is annular and is in contact with the other surface 332 of the flange portion 33 entirely in the circumferential direction of the flange portion 33. The seal ring 61 is made of only synthetic rubber. The seal ring 61 may be mainly made of a rubber material. The seal ring 61 corresponds to an annular housing-side seal portion that blocks the flow of fluid between the valve seat member 30 and the housing-space inner wall 104.

The other configuration of the valve device 1 is the same as that of the first embodiment. Therefore, according to the present embodiment, the same effect as that of the first embodiment is also achieved.

Fourth Embodiment

Figure 19:
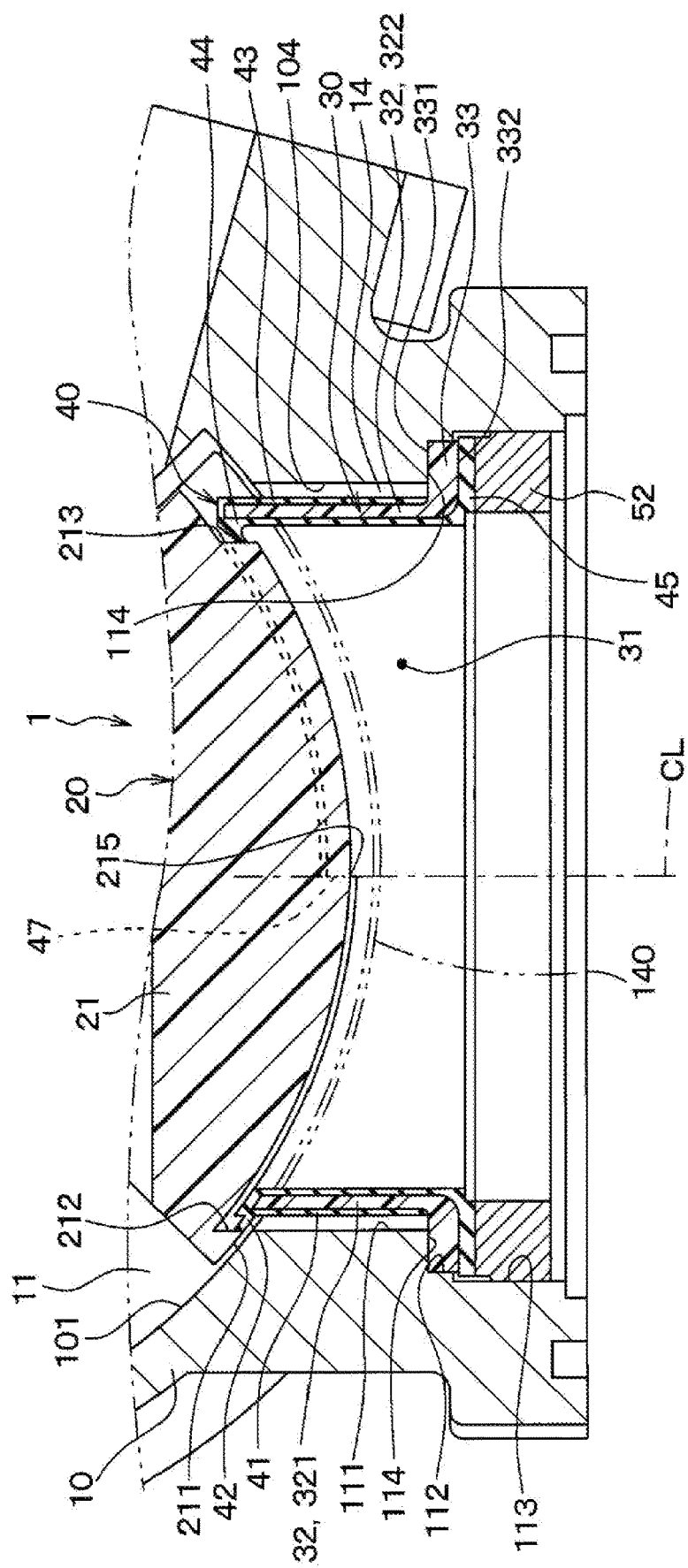
FIG. 19 is a partial cross-sectional view illustrating a valve device of a fourth embodiment.

As shown in FIG. 19, in the present embodiment, the valve device 1 does not include the wave washer 51 of the first embodiment. Only the third covering portion 45 is directly interposed between the flange portion 33 and the fixing ring 52. The third covering portion 45 covers the entire area of the other surface 332 of the flange portion 33 in the radial direction.

The other configuration of the valve device 1 is the same as that of the first embodiment. Therefore, the effects (1) and (4) of the first embodiment can be obtained also by this embodiment.

In this embodiment, it is preferable that the third covering portion 45a is made of a material that does not easily deteriorate. Further, as in the present embodiment, in the valve device 1 of the third embodiment, only the seal ring 61 may be directly interposed between the flange portion 33 and the fixing ring 52.

OTHER EMBODIMENTS (1) In each of the embodiments, when the valve member 20 closes the valve seat passage 31, the first protruding portion 42 and the second protruding portion 44 are tilted by the seal surfaces 212 and 213. However, the first protruding portion 42 and the second protruding portion 44 may be compressed on the seal surfaces 212 and 213.

Figure 20:
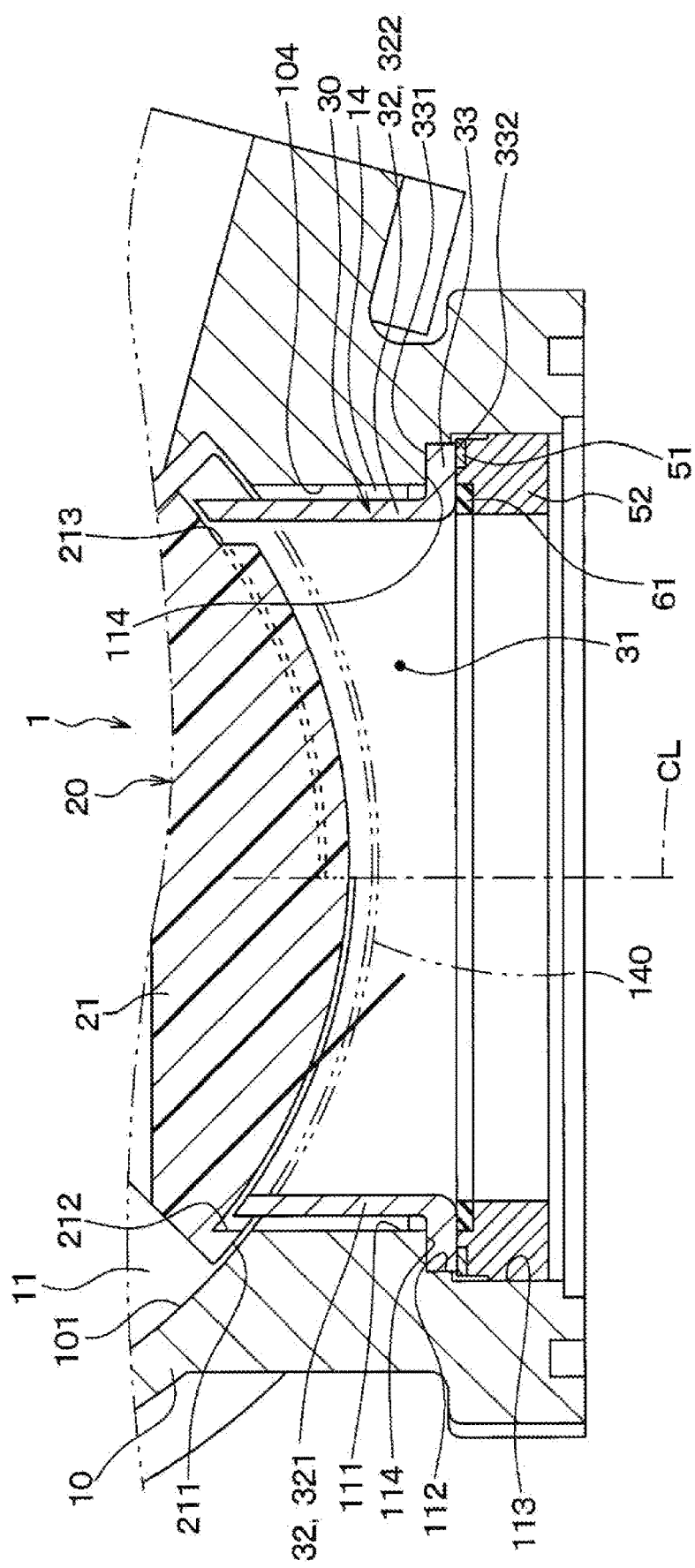
FIG. 20 is a partial cross-sectional view illustrating a valve device of the other embodiment.

(2) In the third embodiment, the valve device 1 does not have to include the seal member 40. Specifically, as shown in FIG. 20, the valve member 20 may block the valve seat passage 31 by directly contacting the valve seat member 30 with the valve body 21.

(3) In each of the embodiments, the wave washer 51 is mainly composed of a metal material. However, the wave washer 51 may be mainly composed of a synthetic resin material. In general, synthetic resin materials have less deterioration than rubber materials. Therefore, even in this case, the effects (2) and (3) of the first embodiment can be obtained.

(4) In each of the embodiments, the wave washer 51 is used as the spring member. However, a spring member having the other shape may be used. Further, the spring constant of the spring member may be the same as the spring constant of the third covering portion 45 or the seal ring 61. Even in this case, the effects (2) and (3) of the first embodiment can be obtained. Further, the spring constant of the spring member may be smaller than the spring constant of the third covering portion 45 or the seal ring 61 while the flange portion 33 can be pressed against the step surface 114 with a load of a certain level or more. In order to press the flange portion 33 against the step surface 114 with a load of a certain level or more, the spring constant of the spring member is preferably greater than or equal to the spring constant of the third covering portion 45 or the seal ring 61.

(5) In each of the embodiments, the valve body 21 has a tubular shape. However, the valve body 21 may be spherical.

(6) In each of the embodiments, the valve device 1 is applied to the engine system 90. However, the valve device 1 may be applied to other applications. The fluid flowing inside the valve device 1 is not limited to gas, but may be liquid.

(7) In each of the embodiments, the housing 10, the fixing ring 52, the upper shaft 24, and the lower shaft 25 are made of a metal material, however, may be made of a synthetic resin material.

(8) In each of the embodiments, the valve body 21 and the valve seat member 30 are made of a synthetic resin material, however, may be made of a metal material.

(9) The present disclosure is not limited to the above-described embodiment, and can be changed as appropriate, and includes various modifications and modifications within an equal range. The above embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. The materials, shapes, positional relationships, or other conditions of the constituent elements and the like described in the respective embodiments are not limited to specific materials, shapes, positional relationships, or other conditions unless clearly expressed, or limited to the specific materials, shapes, positional relationships, or other conditions in principle.

(Overview)

According to the first aspect shown in part or all of the embodiments, a valve device includes: a housing having a valve-chamber inner wall forming a valve chamber and a housing-space inner wall forming a housing space communicated with the valve chamber; a valve member housed in the valve chamber and having a valve body shaped in tubular or spherical; a valve seat member housed in the housing space and forming a valve seat passage that is opened and closed by the valve body; an annular fixing member housed in the housing space and fixing the valve seat member to the housing; and an annular housing-side seal portion housed in the housing space to block a flow of fluid between the valve seat member and the housing-space inner wall. The valve seat member has a tubular portion in which the valve seat passage is formed, and a flange portion connected to the tubular portion opposite to the valve chamber. The flange portion has an annular shape protruding outward from the tubular portion. The housing-space inner wall has an annular facing surface facing the flange portion in an axial direction of the flange portion. The valve seat member is fixed to the housing by the flange portion interposed between the facing surface and the fixing member in the axial direction. The fixing member is fixed to the housing-space inner wall in an airtight state between the fixing member and the housing-space inner wall, and the housing-side seal portion is made of a rubber material and is interposed between the flange portion and the fixing member.

Further, according to the second aspect, the valve device further includes a spring member that presses the valve seat member against the housing by utilizing a reaction force generated during elastic deformation. The spring member is made of a metal material or a synthetic resin material, and is interposed between the flange portion and the fixing member at a position on an inner peripheral side or outer peripheral side of the housing-side seal portion.

In order to fix the valve seat member to the housing, it is preferable to press the flange portion against the facing surface with a load of a certain amount or more. However, if only the housing-side seal portion is interposed between the flange portion and the fixing member, the flange portion cannot be pressed against the facing surface with a load of a certain amount due to deterioration of the housing-side seal portion. In this case, the valve seat member rotates, and the position of the valve seat member shifts with respect to the housing. The position of the valve seat member with respect to the valve body is displaced. Therefore, when the valve body is located at a position that closes the valve seat passage, the sealing between the valve body and the valve seat member cannot be performed. If only the housing-side seal portion is interposed between the flange portion and the fixing member in this way, it is not possible to maintain the fixing of the valve seat member to the housing.

According to the second aspect, the spring member is supported between the flange portion and the fixing member at a position on the inner peripheral side or the outer peripheral side of the housing-side seal portion. Therefore, the flange portion can be pressed against the facing surface with a load of a certain level or more by utilizing the reaction force generated when the spring member is elastically deformed.

Further, the spring member is mainly made of a metal material or a synthetic resin material. In general, metal materials and synthetic resin materials have less deterioration in the elastic property than rubber materials. Therefore, the elasticity of the spring member is less deteriorated than that of the housing-side seal portion. Compared to the case where only the housing-side seal portion is supported between the flange portion and the fixing member, the flange portion can be continuously pressed against the facing surface with a load of a certain level or more, and the valve seat member can be kept in the fixed state with respect to the housing.

According to the third aspect, the spring member is arranged on the outer peripheral side of the housing-side seal portion. The facing surface has a contact end which is an inner peripheral end of the region in contact with the flange portion. At least a part of the housing-side seal portion is arranged on the inner peripheral side of the contact end. The housing-side seal portion and the spring member are interposed between the flange portion and the fixing member so that the reaction force generated in the housing-side seal portion due to the elastic deformation is smaller than the reaction force generated in the spring member due to the elastic deformation.

Accordingly, the force applied to the part of the flange portion on the inner peripheral side of the contact end can be suppressed to be small. Therefore, the moment (force) acting to the flange portion around the contact end can be reduced. Therefore, the deformation of the flange portion can be suppressed.

Further, according to the fourth aspect, the housing-side seal portion and the valve seat member are configured as an integrally molded product. Accordingly, the number of parts can be reduced as compared with the case where the housing-side seal portion and the valve seat member are configured as separate bodies.

Further, according to the fifth aspect, the valve device further includes: a valve-side seal portion provided on the tubular portion adjacent to the valve chamber to close a gap between the valve body and the valve seat member by coming into contact with the valve body; and a connector that connects the valve-side seal portion and the housing-side seal portion. The valve-side seal portion, the housing-side seal portion, and the connector are made of a same material and are seamlessly continuous.

Accordingly, the valve-side seal portion, the housing-side seal portion and the connector are formed at the same time. In this way, when the valve device includes the valve-side seal portion, the valve-side seal portion and the housing-side seal portion can be molded at the same time, and the housing-side seal portion and the valve seat member can be integrally molded.

What is claimed is:
1. A valve device comprising:
 a housing having a valve-chamber inner wall forming a valve chamber and a housing-space inner wall forming a housing space communicated with the valve chamber;
 a valve member housed in the valve chamber and having a valve body shaped in tubular or spherical;
 a valve seat member housed in the housing space and forming a valve seat passage that is opened and closed by the valve body;
 an annular fixing member housed in the housing space and fixing the valve seat member to the housing; and
 an annular housing-side seal portion that is housed in the housing space to block a flow of fluid between the valve seat member and the housing-space inner wall, wherein
 the valve seat member has
  a tubular portion in which the valve seat passage is formed, and a flange portion connected to the tubular portion opposite to the valve chamber, the flange portion having an annular shape protruding outward from the tubular portion, the housing-space inner wall has an annular facing surface facing the flange portion in an axial direction of the flange portion, the valve seat member is fixed to the housing by the flange portion interposed between the facing surface and the fixing member in the axial direction, the fixing member is fixed to the housing-space inner wall in an airtight state between the fixing member and the housing-space inner wall, and the housing-side seal portion is made of a rubber material and is interposed between the flange portion and the fixing member.

2. The valve device according to claim 1, further comprising a spring member that presses the valve seat member against the housing by utilizing a reaction force generated during elastic deformation, wherein the spring member is made of a metal material or a synthetic resin material, and is interposed between the flange portion and the fixing member at a position on an inner peripheral side or outer peripheral side of the housing-side seal portion.

3. The valve device according to claim 2, wherein the spring member is arranged on the outer peripheral side of the housing-side seal portion, the facing surface has a contact end which is an inner peripheral end of a region in contact with the flange portion, at least a part of the housing-side seal portion is arranged on an inner peripheral side of the contact end, and the housing-side seal portion and the spring member are interposed between the flange portion and the fixing member so that the reaction force generated in the housing-side seal portion due to elastic deformation is smaller than the reaction force generated in the spring member due to elastic deformation.

4. The valve device according to claim 1, wherein the housing-side seal portion and the valve seat member are configured as an integrally molded product.

5. The valve device according to claim 4, further comprising:

a valve-side seal portion provided on the tubular portion adjacent to the valve chamber to close a gap between the valve body and the valve seat member by coming into contact with the valve body; and a connector that connects the valve-side seal portion and the housing-side seal portion, wherein the valve-side seal portion, the housing-side seal portion, and the connector are made of a same material and are seamlessly continuous.

* * * * *